US012669814B2

(12) United States Patent
Waterbury et al.

(10) Patent No.: US 12,669,814 B2
(45) Date of Patent: Jun. 30, 2026

(54) CONTROL OF SENSOR-EQUIPPED ASSET BASED ON AGGREGATED RISK VALUES

(71) Applicant: UPTAKE TECHNOLOGIES, INC., Chicago, IL (US)

(72) Inventors: Sam Waterbury, Chicago, IL (US); Brian Silva, Chicago, IL (US)

(73) Assignee: UPTAKE TECHNOLOGIES, INC., Chicago, IL (US)

( * ) Notice: Subject to any disclaimer, the term of this patent is extended or adjusted under 35 U.S.C. 154(b) by 610 days.

(21) Appl. No.: 18/107,586

(22) Filed: Feb. 9, 2023

(65) Prior Publication Data
US 2024/0272630 A1    Aug. 15, 2024

(51) Int. Cl.
G05B 23/02          (2006.01)
G06N 5/022          (2023.01)

(52) U.S. Cl.
CPC ......... G05B 23/0283 (2013.01); G06N 5/022 (2013.01)

(58) Field of Classification Search
None
See application file for complete search history.

(56) References Cited

U.S. PATENT DOCUMENTS

| | | | | |
|---|---|---|---|---|
| 6,636,814 B1 * | 10/2003 | McCullers | ......... | G05B 23/0283 701/19 |
| 2007/0193744 A1 * | 8/2007 | Bridges | .................... | H05B 6/62 166/272.1 |
| 2014/0365271 A1 * | 12/2014 | Smiley | ............... | G06Q 10/0635 705/7.28 |
| 2016/0120126 A1 * | 5/2016 | Weber | ................. | A01D 46/084 56/16.4 B |
| 2022/0101219 A1 * | 3/2022 | Nguyen | ................. | H02J 3/381 |
| 2022/0129560 A1 * | 4/2022 | Bulut | .................... | G06N 20/00 |
| 2023/0418281 A1 * | 12/2023 | Lee | .................. | G06Q 10/06315 |

* cited by examiner

*Primary Examiner* — Bernard G Lindsay
(74) *Attorney, Agent, or Firm* — MARSHALL, GERSTEIN & BORUN LLP

(57)          ABSTRACT

Computing systems and methods for determining aggregated risk are disclosed herein. An exemplary computing platform includes: a communication interface, one or more processors, a non-transitory computer-readable medium, and program instructions stored on the non-transitory computer-readable medium. The program instructions, when executed, cause the computing platform to: execute a set of predictive models that are each configured to (i) evaluate operating data for the asset and (ii) output a respective prediction related to an operation of the asset; detect a triggering event for determining an aggregated risk value for the asset; identify (i) a set of predictions related to the operation of the asset and (ii) a risk dataset; determine the aggregated risk value of the asset based on the set of predictions and the risk dataset; and cause a client device to display a visual representation of the aggregated risk value.

12 Claims, 17 Drawing Sheets

300

CREATE A PLURALITY OF PREDICTIVE MODELS          302

ESTABLISH ONE OR MORE RISK DATASETS          304

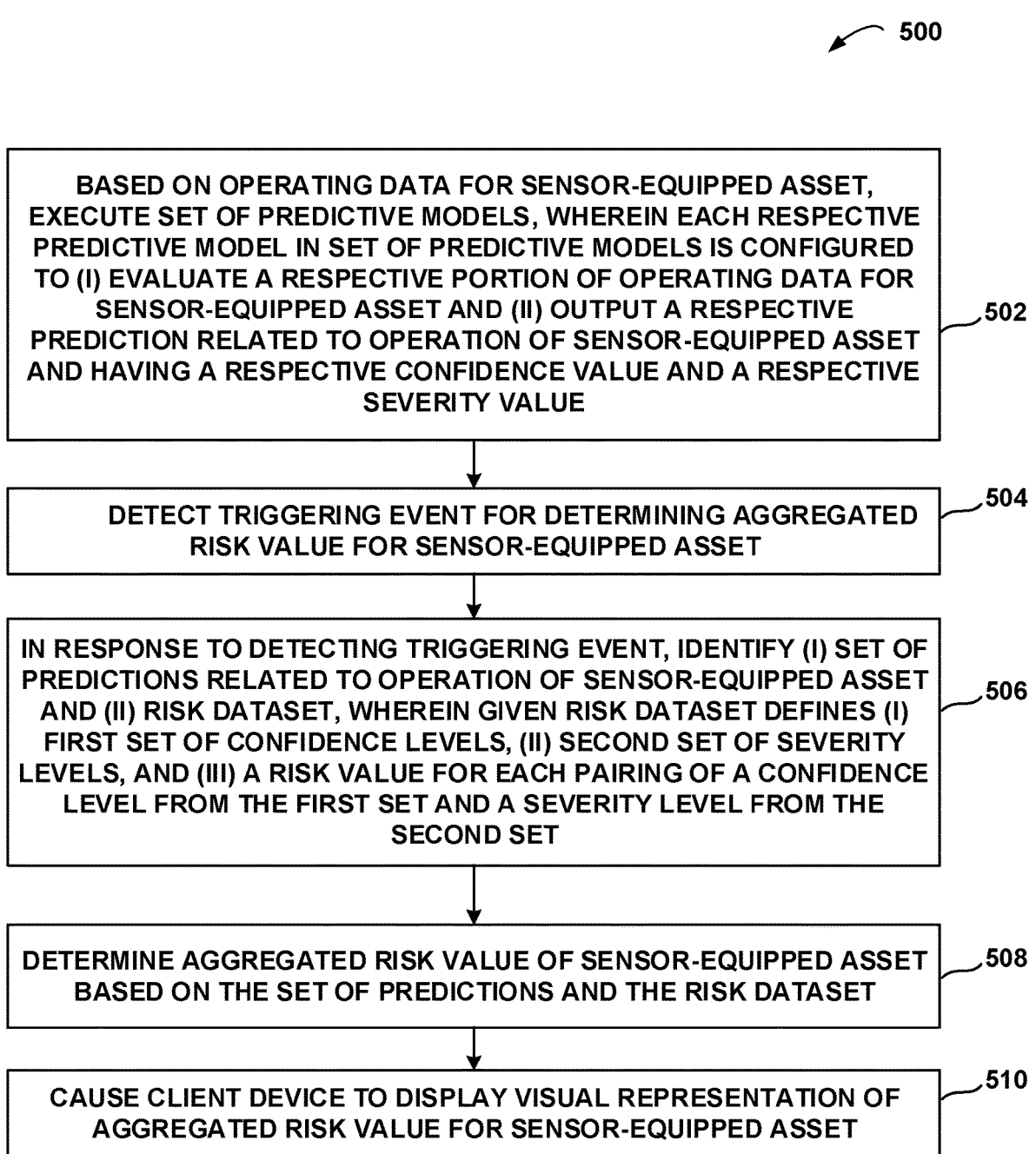

500

BASED ON OPERATING DATA FOR SENSOR-EQUIPPED ASSET, EXECUTE SET OF PREDICTIVE MODELS, WHEREIN EACH RESPECTIVE PREDICTIVE MODEL IN SET OF PREDICTIVE MODELS IS CONFIGURED TO (I) EVALUATE A RESPECTIVE PORTION OF OPERATING DATA FOR SENSOR-EQUIPPED ASSET AND (II) OUTPUT A RESPECTIVE PREDICTION RELATED TO OPERATION OF SENSOR-EQUIPPED ASSET AND HAVING A RESPECTIVE CONFIDENCE VALUE AND A RESPECTIVE SEVERITY VALUE

502

DETECT TRIGGERING EVENT FOR DETERMINING AGGREGATED RISK VALUE FOR SENSOR-EQUIPPED ASSET

504

IN RESPONSE TO DETECTING TRIGGERING EVENT, IDENTIFY (I) SET OF PREDICTIONS RELATED TO OPERATION OF SENSOR-EQUIPPED ASSET AND (II) RISK DATASET, WHEREIN GIVEN RISK DATASET DEFINES (I) FIRST SET OF CONFIDENCE LEVELS, (II) SECOND SET OF SEVERITY LEVELS, AND (III) A RISK VALUE FOR EACH PAIRING OF A CONFIDENCE LEVEL FROM THE FIRST SET AND A SEVERITY LEVEL FROM THE SECOND SET

506

DETERMINE AGGREGATED RISK VALUE OF SENSOR-EQUIPPED ASSET BASED ON THE SET OF PREDICTIONS AND THE RISK DATASET

508

CAUSE CLIENT DEVICE TO DISPLAY VISUAL REPRESENTATION OF AGGREGATED RISK VALUE FOR SENSOR-EQUIPPED ASSET

Details

Vin
1FVHGGS5LXMH

Description
2019 T8

Engine
X15

Fuel Type
Diesel

Odometer Reading
136,603 mi

Assigned Location
Albany, NY

Recent History

Date ⬭ Odometer Reading

⊞ Cases

▨ Insight

⊠ Work Orders

5/91      6/15      6/39

<u>View Faults Timeline</u>

Current Insights

| Insight Name ⌄ | Subsystem ⌄ |
|---|---|
| Engine Overheating | Engine |
| DPF Regan Issue | Engine |
| EGR Cooler | Aftertreatment |
| Coolant Leak | Aftertreatment |
| Engine Protection | Cooling |

Recent Work Orders

| Work Order ID ⌄ | Work Description ⌄ |
|---|---|
| 235593-1 | Exhaust System |
| 235593-2 | Steering |
| 235593-6 | Charging System |
| 235593-5 | Cooling System |
| 235593-4 | Cranking System |

| Risk (%) | Insight Start | Insight Type | Insight End | Insight Status | Still Active | First Action |
|---|---|---|---|---|---|---|
| ☑ Very High | 6/21/2021 | Signal-Based | . | Not Activated | ✓ | . |
| ☑ High | 6/21/2021 | Fault-Based | . | Not Activated | ✓ | . |
| ☑ High | 6/21/2021 | CMMS-Based | . | Not Activated | ✓ | . |
| ▥ Medium | 6/21/2021 | Signal-Based | 6/23/2021 | Accepted | | 6/23/2021 |
| ▤ Low | 6/21/2021 | Signal-Based | 6/23/2021 | Accepted | ✓ | 6/23/2021 |

| Created On | Assigned To | Notes |
|---|---|---|
| 4/4/2021 | Smith, Joe | 043-Forced Regan Of After Treatment System Required r… |
| 3/5/2021 | Smith, Joe | 015-Power Steering Fluid PM - Replace power Steerin… |
| 12/5/2020 | Smith, Joe | Alternator Belts Electrical System |
| 6/21/2021 | Smith, Joe | Water Pump R/R |
| 6/22/2021 | Smith, Joe | Batteries 1-4 R/R |

FIG. 7b (Continued)

CONTROL OF SENSOR-EQUIPPED ASSET BASED ON AGGREGATED RISK VALUES

FIELD OF THE DISCLOSURE

The present disclosure generally relates to systems and methods for improved risk determination, and more particularly, to systems and methods for determining aggregated risk values that can optimize predictive maintenance procedures.

BACKGROUND OF THE DISCLOSURE

Today, machines (also referred to herein as "assets") are ubiquitous in many industries. From locomotives that transfer cargo across countries to farming equipment that harvest crops, assets play an important role in everyday life. Depending on the role that an asset serves, its complexity and cost may vary. Further, different assets have different maintenance schedules, and even identical assets performing different roles may have vastly different maintenance demands. Thus, it is increasingly desirable to monitor and analyze the operation of assets in an operating environment over various durations of time to understand when such assets may require maintenance.

However, conventional techniques to perform such monitoring or analysis suffer from numerous drawbacks. Namely, conventional techniques rely on individual machinery operator opinions regarding the risk associated with predicted problems with assets, which are notoriously inconsistent from operator-to-operator, and are generally inaccurate. These opinions are then commonly combined with low-confidence, model-based predictions, such that conventional techniques frequently suffer from an inability to provide accurate, useful risk assessments for assets. As a result, the assets suffer from significantly reduced uptime, increased maintenance costs, and the corresponding processes relying on those assets are negatively impacted.

Accordingly, it is generally desirable to monitor and analyze the operation of assets to help reduce asset downtime, minimize maintenance costs and requirements, and maximize the overall utility of the assets.

SUMMARY

The present disclosure generally relates to computing systems and methods for determining aggregate risk values of assets. In particular, systems and methods are disclosed for utilizing predictive models to identify potential problems, inefficiencies, and/or degradations in industrial assets (e.g., machinery, vehicles, etc.) through such aggregate risk values. The predictive models described in the present disclosure output confidence and severity values that are analyzed in conjunction with a risk dataset to determine the aggregate risk value for an asset. Confidence and severity values may be independent of operator preferences, while risk values included in the risk dataset are customizable by each operator. In this manner, the systems and methods of the present disclosure may enable operators to perform informative, objective risk assessment for assets that accurately accounts for prediction confidence and individual operator preferences/opinions.

As an example, a first operator and a second operator may independently perform a risk assessment for a first asset (e.g., a first vehicle) and a second asset (e.g., a second vehicle). Using conventional systems, the first operator may perform the risk assessment for the first asset and receive an indication that the first asset has a 50% probability of the engine overheating. The first operator may determine that this likelihood of the engine overheating represents a substantial risk, such that the first operator may characterize this indication as a "high" risk issue. Similarly, the first operator may perform the risk assessment for the second asset and receive an indication that the second asset has a 80% probability of a taillight being broken. The first operator may determine that this likelihood of the taillight being broken represents a minimal risk, such that the first operator may characterize this indication as a "low" risk issue.

Continuing this example, the second operator may also perform the risk assessment for the first asset and the second asset. The second operator may receive the same indication that the first asset has a 50% probability of the engine overheating, but the second operator may determine that this likelihood of the engine overheating represents a moderate risk. Thus, unlike the first operator, the second operator may characterize this indication as a "medium" risk issue. Similarly, the second operator may receive the indication that the second asset has an 80% probability of a taillight being broken, and the second operator may determine that this likelihood of the taillight being broken also represents a moderate risk. Thus, unlike the first operator, the second operator may characterize this indication as a "medium" risk issue.

Accordingly, in the prior example, the two operators determined different severity values for each of the assets, such that the assets may receive different maintenance prioritizations based on the operators' differences of opinion. For example, based on the severity values determined by the first operator, the first asset may receive maintenance priority over the second asset because the "high" risk of the engine overheating is potentially more severe than the "low" risk of the broken taillight. Based on the severity values determined by the second operator, the second asset may receive maintenance priority over the first asset because the "medium" risk of the broken taillight at 80% confidence is potentially more severe than the "medium" risk of the engine overheating at 50% confidence. Thus, the inexperience or ignorance of a particular operator using conventional techniques can lead to disparate determinations of risk, and ultimately, damage or failure of assets due to erroneous maintenance prioritization.

By contrast, the systems and methods of the present disclosure overcome these and other issues of conventional techniques by executing a set of predictive models that are configured to evaluate a respective portion of operating data for a sensor-equipped asset and output a respective prediction related to an operation of the sensor-equipped asset. Generally speaking, the systems and methods of the present disclosure may determine an aggregated risk value of a sensor-equipped asset based on a set of predictions and a risk dataset. More specifically, the systems and methods of the present disclosure may execute the predictive models to output predictions related to the operation of the sensor-equipped asset, identify predictions and a risk dataset in response to detecting a triggering event, and determining the aggregated risk value based on the predictions and the risk dataset. These aspects of the present disclosure improve over conventional techniques by aggregating any number of model predictions while accounting for both the severity and confidence of individual predictions in a manner that is simply unachievable by such conventional techniques.

In accordance with various embodiments herein, a computing platform is disclosed for determining aggregated risk values. The computing platform may comprise: a communication interface, one or more processors, a non-transitory computer-readable medium, and program instructions stored on the non-transitory computer-readable medium that are executable by the one or more processors. The program instructions, when executed by the one or more processors, may cause the computing platform to: based on operating data for a sensor-equipped asset, execute a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value; detect a triggering event for determining an aggregated risk value for the sensor-equipped asset; responsive to detecting the triggering event, identify (i) a set of predictions related to the operation of the sensor-equipped asset and (ii) a risk dataset, wherein the risk dataset defines (a) a first set of confidence levels, (b) a second set of severity levels, and (c) a risk value for each pairing of a confidence level from the first set and a severity level from the second set; determine the aggregated risk value of the sensor-equipped asset based on the set of predictions and the risk dataset; and cause a client device to display a visual representation of the aggregated risk value for the sensor-equipped asset.

In a variation of this embodiment, the aggregated risk value comprises an asset-level aggregated risk value, and wherein the set of predictive models comprises predictive models related to a plurality of subsystems of the sensor-equipped asset.

In another variation of this embodiment, the aggregated risk value comprises a subsystem-level aggregated risk value, and wherein the set of predictive models comprises predictive models related to a subsystem of the sensor-equipped asset.

In yet another variation of this embodiment, the program instructions are further executable by the one or more processors to cause the computing platform to determine the aggregated risk value by: for each severity level from the second set, identifying a matching associated severity value from the respective predictions; for each severity level having one or more matching associated severity values from the respective predictions identified: determining a severity-specific confidence level by either: (i) if one matching associated severity value is identified, determining that the respective severity level has a severity-specific confidence level corresponding to an associated confidence value of the respective prediction, or (ii) if two or more of the respective predictions are identified, determining that the respective severity level has a severity-specific confidence level corresponding to an aggregation of associated confidence values of the respective predictions, and based on the severity-specific confidence level and the risk dataset, determining a severity-specific risk value for the respective severity level; and determining the aggregated risk value based on the one or more severity-specific risk values.

Further in this variation, the program instructions are further executable by the one or more processors to cause the computing platform to use the one or more severity-specific risk values to determine the aggregated risk value by: comparing the one or more severity-specific risk values to determine a highest risk value; and determining that the highest risk value is the aggregated risk value for the sensor-equipped asset. Still further in this variation, the program instructions are further executable by the one or more processors to cause the computing platform to: determine the aggregation of the associated confidence values by:

for each of the two or more of the respective predictions, determining a complement value of the associated confidence values, multiplying the complement values together and thereby determining a product of the complement values, and determining a product complement value of the product of the complement values; and determining that the severity-specific confidence level corresponds to the product complement value.

In still another variation of this embodiment, the risk dataset comprises a risk dataset that is pre-established based on user input.

In yet another variation of this embodiment, the program instructions are further executable by the one or more processors to cause the computing platform to: determine that the aggregated risk value for the sensor-equipped asset meets a threshold risk criteria; and in response to the determination, execute a remedial action for the sensor-equipped asset. Further in this variation, the remedial action comprises one or more of: (a) causing a computing device to output an alert indicating that the aggregated risk value for the sensor-equipped asset meets the threshold risk criteria, (b) causing the computing device to output an indication of one or more recommended repairs to the sensor-equipped asset, (c) causing the sensor-equipped asset to modify its operation, or (d) transmitting, to a parts ordering system, part-order data to cause the parts-ordering system to order a component for the sensor-equipped asset.

In still another variation of this embodiment, the set of predictive models comprises one or more of: (i) an event-prediction model, (ii) a survival analysis model, (iii) an anomaly detection model, or (iv) a rule-based model.

In yet another variation of this embodiment, the program instructions are further executable by the at least one processor to cause the computing platform to: prior to receiving the operating data for the sensor-equipped asset, cause a second client device to present an interface for establishing the risk dataset. Further in this variation, the respective confidence value represents a likelihood of the respective prediction being correct; and the respective severity value is from a set of predefined severity values available for assignment to predictions, wherein each severity value in the set of predefined severity values is a predefined categorization of impact severity that provides an indication of how severely the operation of the sensor-equipped asset is expected to be impacted by an occurrence of an event related to the operation of the sensor-equipped asset.

In still another variation, each confidence level of the first set comprises a range of confidence values; each severity level of the second set is from a set of predefined severity levels available for assignment to predictions; and the risk value is from a set of risk values and comprises a textual indicator that indicates a risk associated with a prediction.

In additional embodiments, a computer-implemented method for determining aggregated risk values is disclosed. The computer-implemented method comprises: executing, by one or more processors and based on operating data for a sensor-equipped asset, a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value; detecting, by the one or more processors, a triggering event for determining an aggregated risk value for the sensor-equipped asset; responsive to detecting the triggering event, identifying, by the one or more processors, (i) a set of predictions related to the operation of the sensor-equipped asset and (ii) a risk dataset, wherein the risk dataset defines (a) a first set of confidence levels, (b) a second set of severity levels, and (c) a risk value for each pairing of a confidence level from the first set and a severity level from the second set; determining, by the one or more processors, the aggregated risk value of the sensor-equipped asset based on the set of predictions and the risk dataset; and causing, by the one or more processors, a client device to display a visual representation of the aggregated risk value for the sensor-equipped asset.

In still further embodiments, a computer readable storage medium comprising non-transitory computer readable instructions stored thereon for determining aggregated risk values is disclosed. The instructions when executed on one or more processors may cause the one or more processors to: execute, based on operating data for a sensor-equipped asset, a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value; detect a triggering event for determining an aggregated risk value for the sensor-equipped asset; responsive to detecting the triggering event, identify (i) a set of predictions related to the operation of the sensor-equipped asset and (ii) a risk dataset, wherein the risk dataset defines (a) a first set of confidence levels, (b) a second set of severity levels, and (c) a risk value for each pairing of a confidence level from the first set and a severity level from the second set; determine the aggregated risk value of the sensor-equipped asset based on the set of predictions and the risk dataset; and cause a client device to display a visual representation of the aggregated risk value for the sensor-equipped asset.

In accordance with the above, and with the disclosure herein, the present disclosure includes improvements in underlying computer functionality or in improvements to other technologies at least because the present disclosure includes, e.g., determining an aggregated risk value of a sensor-equipped asset based on a set of predictions from a set of predictive models and a risk dataset. That is, the present disclosure describes improvements in the functioning of an underlying computing system itself or "any other technology or technical field" because an asset management system, and its underlying processing hardware and devices, are improved by determining aggregate risk values for assets based on predictive models utilizing operating data of the asset as well as risk datasets defining confidence levels, severity levels, and risk values. This provides an improvement over prior systems that do not implement such determinations of aggregate risk for assets, as described herein.

Additionally, or alternatively, the present disclosure relates to improvements to other technologies or technical fields at least because operating data of an asset may be utilized by predictive models to output predictions relating to an operation of the asset. Moreover, a risk dataset is utilized in tandem with these predictions to determine the aggregate risk value, and the risk dataset defines confidence levels, severity levels, and a risk value for each pairing of confidence levels and severity levels that may include individual operator preferences. In this manner, the systems and methods of the present disclosure improve the technical field of asset management at least by providing accurate, consistent risk determinations for assets that are aggregated over both confidence and severity values and incorporate operator preferences, while maintaining the overall reusability and maintainability of the prediction models.

Still further, the present disclosure includes specific features other than what is well-understood, routine, conventional activity in the field, because such features add unconventional steps that confine the disclosure to a particular useful application, e.g., based on operating data for a sensor-equipped asset, executing a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value; responsive to detecting a triggering event, identifying (i) a set of predictions related to the operation of the sensor-equipped asset and (ii) a risk dataset, wherein the risk dataset defines (a) a first set of confidence levels, (b) a second set of severity levels, and (c) a risk value for each pairing of a confidence level from the first set and a severity level from the second set; and/or determining the aggregated risk value of the sensor-equipped asset based on the set of predictions and the risk dataset.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

The present disclosure will now be described in more detail with reference to particular aspects thereof as shown in the accompanying drawings. While the present disclosure is described below with reference to particular aspects, it should be understood that the present disclosure is not limited thereto. Those of ordinary skill in the art having access to the teachings herein will recognize additional implementations, modifications, and aspects, as well as other fields of use, which are within the scope of the present disclosure as described herein, and with respect to which the present disclosure may be of significant utility.

BRIEF DESCRIPTION OF THE DRAWINGS

FIG. 5 depicts a flow diagram of an example method for determining an aggregated risk value for an asset, in accordance with various embodiments disclosed herein.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, modules, and methods may be rearranged, combined, added to, and/or removed in a variety of manners, each of which is contemplated herein.

As noted above, the present disclosure is directed to technology for determination of an aggregated risk value for a sensor-equipped asset. In practice, the disclosed technology may be incorporated into platform software for asset management.

I. Example Network Configuration

Figure 1:
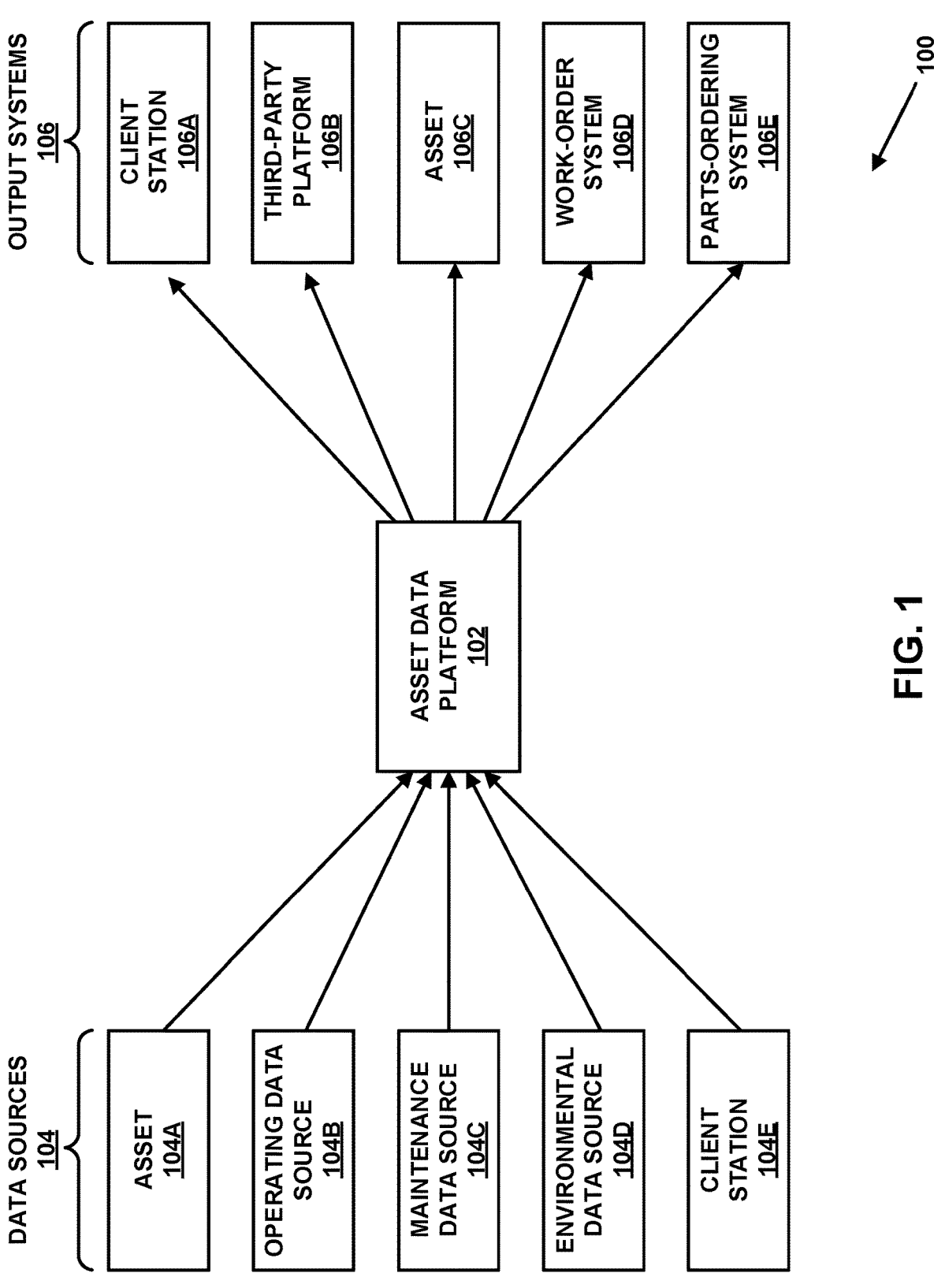
FIG. 1 depicts an example network configuration in which example embodiments may be implemented, in accordance with various embodiments disclosed herein.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers, solar panels), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and data integrity operations, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include (i) an asset performance management application, (ii) a service optimization application, or (iii) an asset dealer operations application, among other possible applications. The software for carrying out the disclosed platform functions may take various other forms as well.

As described above, asset data platform 102 may be configured to receive asset-related data from one or more data sources 104. These data sources—and the asset-related data output by such data sources—may take various forms.

To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"- and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"- and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in monitoring the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.). Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D—and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well. Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, some or all of the forgoing types of data described above with respect to the various data sources 104A-E may ultimately be provided to the asset data platform in the form of physical media. In this example, a user may provide to an operator of asset data platform 102 one or more non-volatile storage mediums, such as read-only memory, a hard-disk drive, a solid-state drive, flash memory, an optical-storage device, etc., whereupon an operator of asset data platform 102 may load this data into the asset data platform 102.

Additionally, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data (e.g., predictions related to operation of a sensor-equipped asset) and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via an application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., aggregated risk values for sensor-equipped assets, predicted failures/risks of a sensor-equipped asset, recommendations, alerts, etc.). As yet another example, data that is output for receipt by client station 106A may include platform configuration data, examples of which may include data that describes how the asset data platform is configured, data that describes the various data sources 104, and data that describes the various output systems 106. Other examples are possible as well.

Along with the asset-related data that is output for receipt by client station 106A, asset data platform 102 may also output associated data and/or instructions that define the visual appearance of an application (e.g., a graphical user interface (GUI)) through which the asset-related data is to be presented on client station 106A. Such data and/or instructions for defining the visual appearance of an application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of an application.

Further, client station 106A may receive asset-related data from asset data platform 102 in various manners. As one possibility, client station 106A may send a request to asset data platform 102 for certain asset-related data and/or a certain application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a third-party data platform 106B operated by a third-party organization that may be interested in the operation and/or management of assets, such as an asset owner, an asset dealer, an asset manufacturer, an asset repair shop, or the like. For instance, a third-party organization such as this may have its own third-party data platform 106B that already enables users to access and/or interact with asset-related data through applications that have been created by the third-party organization, but third-party data platform 106B may not be programmed with the capability to ingest certain types of asset-related data or perform certain types of data analytics operations (and/or third-party data platform 106B may have the capability to perform such operations but it may nevertheless be undesirable for third-party data platform 106B to do so). In such a scenario, asset data platform 102 may be configured to output certain asset-related data for receipt by third-party data platform 106B.

The asset-related data that is output for receipt by third-party data platform 106B may take various forms, including but not limited any of the forms described above in connection with the output to client station 106A. However, unlike for client station 104A, the asset-related data that is output for receipt by third-party data platform 106B typically need not include any associated data and/or instructions for defining the visual appearance of an application, because third-party data platform 106B may be performing operations on the asset-related data from asset data platform 102 beyond presenting it to a user via an application. Further, third-party data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., aggregated risk values for sensor-equipped assets, predicted failures/risks of the sensor-equipped assets, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction.

As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well. Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols. Moreover, in some embodiments, the respective communication paths with asset data platform 102 may represent transfers of data to or from one or more non-volatile storage mediums, such as read-only memory, a hard-disk drive, a solid-state drive, flash memory, an optical-storage device, etc.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. Example Asset Data Platform

Figure 2A:
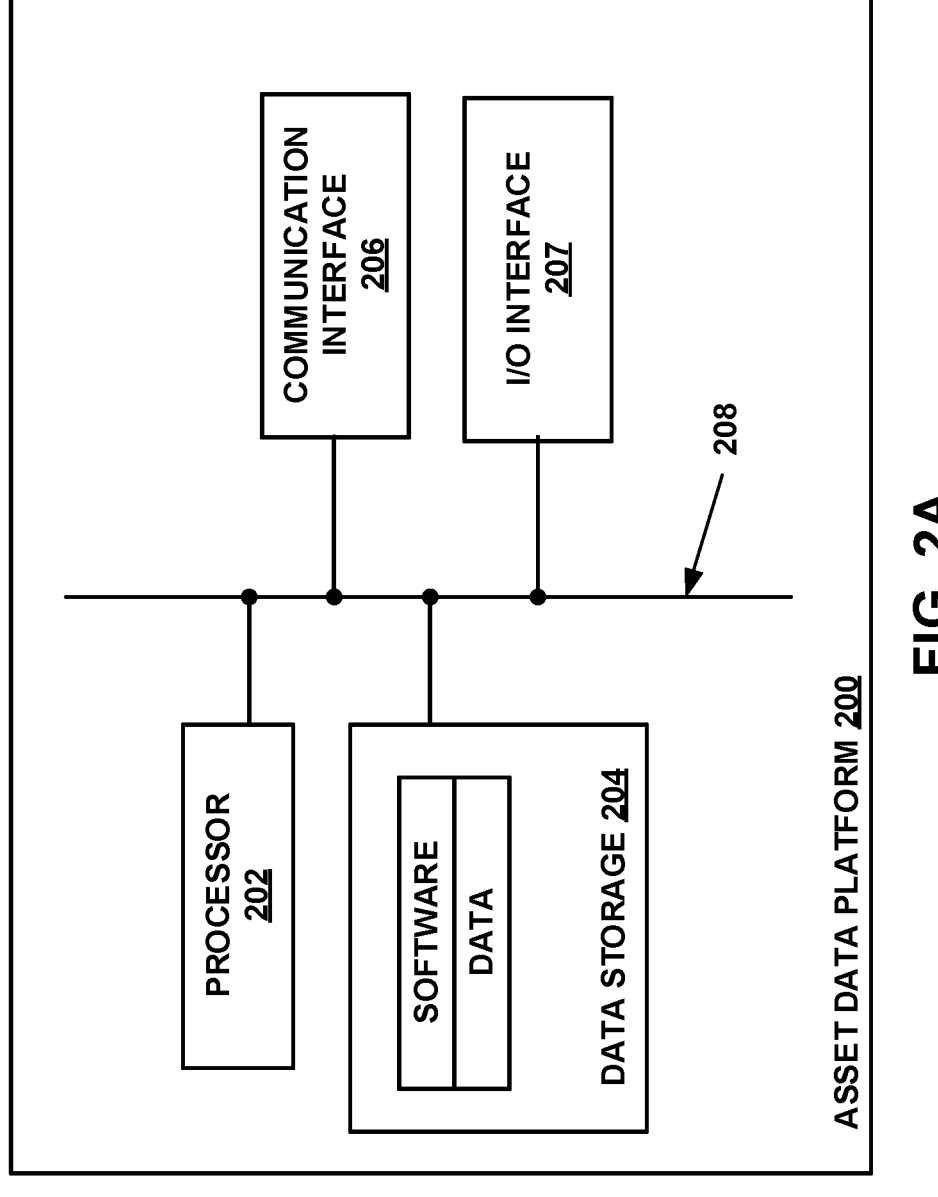
FIG. 2A depicts a simplified block diagram of an example asset data platform from a structural perspective, in accordance with various embodiments disclosed herein.

Turning now to FIG. 2A, this figure is a simplified block diagram illustrating some structural components that may be included in an example asset data platform 200, which could serve as asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2A, data storage 204 may be provisioned with software components that enable platform 200 to carry out the functions disclosed herein. These software components may generally take the form of program instructions that are executable by the processor 202 to carry out the disclosed functions, which may be arranged together into software applications, microservices, virtual machines, software development kits, toolsets, or the like. Further, data storage 204 may be arranged to store asset-related data (e.g., operation data, predictions relating to failures/risk of assets) in one or more databases, file systems, or the like. For example, data storage 204 may be configured to store data using technologies such as Apache Cassandra, Apache Hadoop, Apache Kafka, PostgreSQL, MongoDB, and/or Cloud Native Object Storage technologies (e.g., S3 or Azure Blob), among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Platform 200 may additionally include an input/output (I/O) interface 207 that may itself include one or more interfaces providing connectivity with external user-interface equipment (sometimes referred to as "peripherals"). These peripherals may include a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 2B:
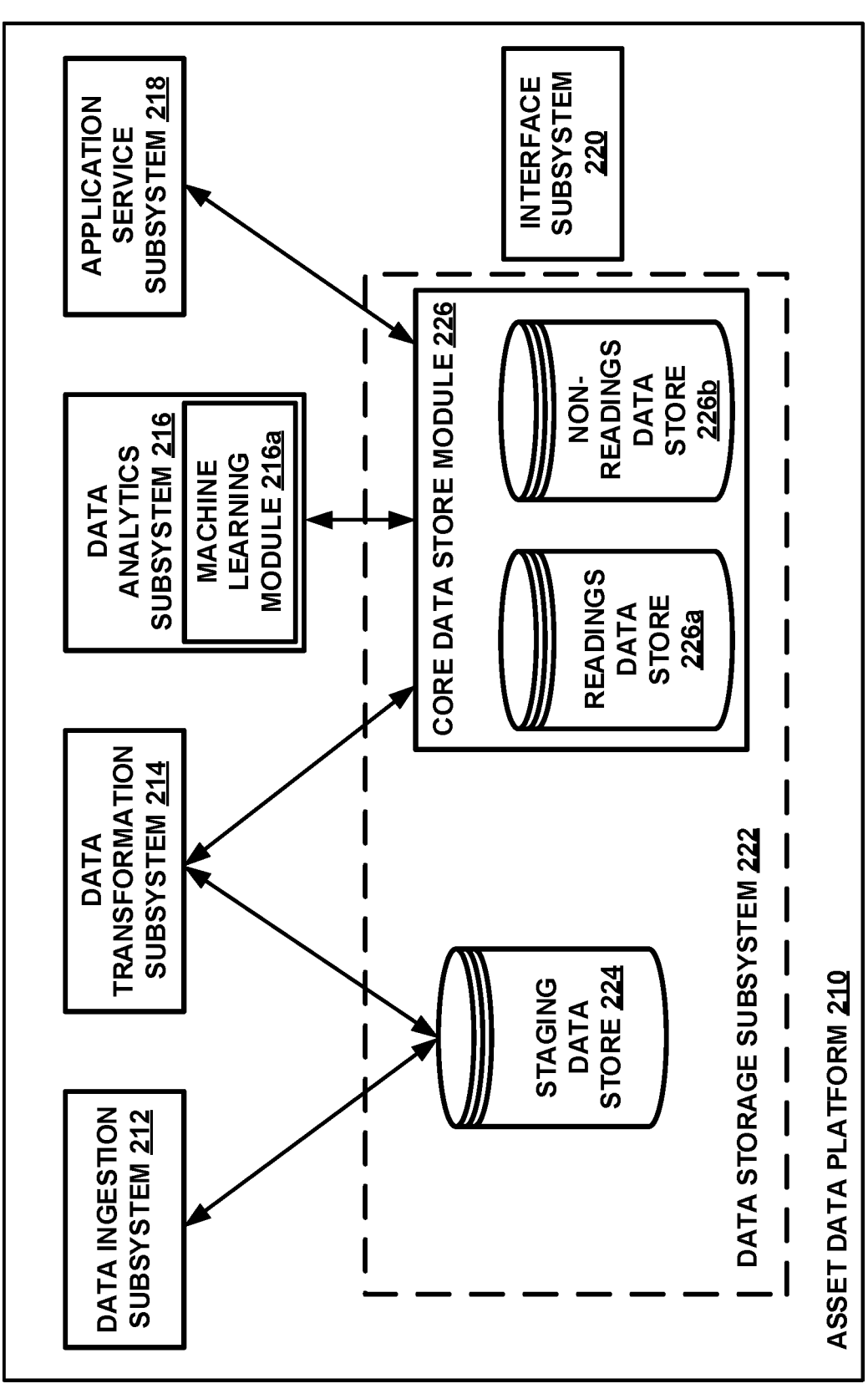
FIG. 2B depicts a simplified block diagram of an example asset data platform from a functional perspective, in accordance with various embodiments disclosed herein.

Turning now to FIG. 2B, another simplified block diagram is provided to illustrate an example functional architecture of an example asset data platform 210, which could serve as asset data platform 102 in FIG. 1. As shown, the example platform 210 may include a data ingestion subsystem 212, a data transformation subsystem 214, a data analytics subsystem 216, an application service subsystem 218, an interface subsystem 220, and a data storage subsystem 222, each of which may comprise a combination of software and hardware elements that are configured to carry out particular functions. In line with the discussion above, the hardware elements that are utilized to implement these functional subsystems may comprise hardware elements of one or more computing systems, which may take the form of computing infrastructure of a public, private, and/or hybrid cloud or one or more dedicated servers, among other possibilities. Further, in practice, these functional subsystems may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

At a high level, data ingestion subsystem 212 may function to ingest asset-related data from one or more data sources (e.g., one or more data sources 104) so that the data can be passed to the other platform modules. To do this, data ingestion subsystem 212 may be configured to connect to and ingest asset-related data from these one or more data sources using any technique now known or later developed.

In one implementation, data ingestion subsystem 212 may be configured to utilize "connections" to facilitate ingesting asset-related data from multiple different types of data sources, where each such data source may provide data in proprietary formats and may involve different protocols for accessing the asset-related data. Generally, a connection is a data structure that describes how data ingestion subsystem 212 connects to and ingests asset-related data from a particular data source. For instance, a connection designed to connect to a particular data source may specify, among other possibilities, (i) what type of "connector" the connection uses and the configuration data of that connector, (ii) the location of the data source (e.g., a web address, IP address, or other network location identifier), (iii) the format of the data available at the data source (e.g., a comma-separated values format or a proprietary data format), (iv) the type of data that will be received from the data source, (v) an identification of which data from the data source will be ingested into asset data platform 210 through the connection, (vi) how often the data will be ingested (e.g., on a real-time basis, or a batch upload basis), and/or (vii) any credentials or other authenticating information that may be necessary for accessing the data source (e.g., username/password, pre-shared keys, etc.). Advantageously, configuration data for the connector used by a given connection will generally be tightly integrated with the security and authorization mechanisms of the Platform. This may help to ensure the data ingested by asset data platform 210 is properly entitled and available only to such personnel who have been authorized to access it. Additionally, the mechanisms for creating platform connectors may enable the integration of third-party tooling as well as the use of custom client connectors during solution engineering.

In practice, data ingestion subsystem 212 may utilize one connection per data source from which data ingestion subsystem 212 will ingest data. In the example arrangement depicted in FIG. 1, if it is desired that the platform ingest asset-related data from each data source 104A-E, then data ingestion subsystem 212 may utilize one connection for each data source 104. In some situations, however, data ingestion subsystem 212 may utilize more than one connection per data source from which data ingestion subsystem 212 will ingest data. Data ingestion subsystem 212 may do this, for instance, when it will ingest some data from a data source in one way (e.g., real-time processing) and other data from the data source in another way (e.g., batched processing). Of course, data ingestion subsystem 212 may be configured to connect to and ingest asset-related data from the one or more data sources in various other manners as well.

Further, data ingestion subsystem 212 may ingest various types of asset-related data. For instance, as one possibility, data ingestion subsystem 212 may ingest what are called "readings" data and "non-readings" data. As a general matter, readings data may refer to asset-related data that is collected on a "high-volume" basis. For instance, readings data may include time-series data that is ingested from data channels that provide data readings at a rate of hundreds, thousands, tens of thousands, or even hundreds of thousands of times per second. For some data sources, data ingestion subsystem 212 may be configured to ingest readings data from these data sources as soon as the readings data is collected by the data source. As such, the readings data that is ingested into asset data platform 210 from such data sources may be considered to be ingested on a real-time or near real-time basis and may be referred to as "instantaneous" readings data. For other data sources, data ingestion subsystem 212 may be configured to ingest readings data once a threshold amount of such readings data has been collected at the data source or once the readings data has been collected for a threshold amount of time, among other possibilities. As such, readings data that is ingested into asset data platform 210 from such data sources may be considered to be ingested on a batched basis and may be referred to as "staged readings" data.

In turn, non-readings data may refer to asset-related data that is collected aperiodically (such as fault-code data channels, work-order data channels, repair activity data channels, etc.) or data that is collected periodically but may not rise to the level of what may constitute "high-volume" data (such as data that may be ingested from data channels that provide data readings on a per minute or per hour basis). The asset-related data that is ingested by data ingestion subsystem 212 may take various other forms as well.

Once asset-related data is ingested by data ingestion subsystem 212, it is stored in data storage subsystem 222 and made available to the data transformation subsystem 214. For instance, the ingested asset-related data may be stored within one or more "staging" data stores 224 of data storage subsystem 222 that are configured to store the raw data ingested into asset data platform 210 by data ingestion subsystem 212 prior to this data being retrieved by data transformation subsystem 214, transformed, then persistently stored in one or more other data stores of data storage subsystem 222 (e.g., core data store module 226).

Data transformation subsystem 214 may be configured to retrieve ingested asset-related data from a staging data store 224, perform one or more transformation on the asset-related data (which may sometimes also be referred to as data preparation and/or data integration operations), and store the data in an appropriate location within the platform's data storage subsystem 222. In this respect, the data transformation operations that are applied by data transformation subsystem 214 may take any of various forms, representative examples of which may include validation, cleansing, deduplication, filtering, aggregation, summarization, enrichment, restructuring, reformatting, translation, mapping, etc.

In one implementation, data transformation subsystem 214 may carry out these operations by utilizing what are called "pipelines." As a general matter, a pipeline is a data structure that generally describes where data is coming from, where data will be stored in data storage subsystem 222, and what, if any, transformations to apply to this data before storing it in data storage subsystem 222. In this respect, a pipeline may generally have three components: (i) a source component that identifies the location in staging data store 224 at which a given set of asset-related data set is stored; (ii) an optional transformation component that identifies a set of one or more transformation operations that are to be applied to some or all of the given set of asset-related data before it is stored in data storage subsystem 222; and (iii) a sink component that identifies the location in data storage subsystem 222 at which the given set of asset-related data will be stored. In this way, a pipeline may function to move a given set of asset-related data from staging data store 224 to data storage subsystem 222 and to transform this data into a format that may be expected by the other modules in the platform (e.g., data analytics subsystem 216 and application service subsystem 218, among others). Of course, data transformation subsystem 214 may be configured to perform data transformation operations on the ingested asset-related data in various other manners as well.

Data analytics subsystem 216 may generally be configured to perform functions that facilitate evaluation of the ingested (and optionally transformed) asset-related data using data analytics operations, which may enable the data analytics subsystem 216 to derive insights from the asset-related data. In this respect, the data analytics operations carried out by the data analytics subsystem 216 may be embodied in any of various forms. For example, a data analytics operation may be embodied in the form of a user-defined rule (or set of rules) that is applied to a particular subset of the ingested (and optionally transformed) asset-related data in order to derive insights from that asset-related data.

As another example, a data analytics operation may be embodied in the form of a data science model that is applied to a particular subset of the ingested (and optionally transformed) asset-related data in order to derive insights from that asset-related data. In practice, such a data science model may comprise a machine learning model that has been created by applying one or more machine learning techniques to a set of training data, examples of which may include regression, random forest, support vector machines (SVM), artificial neural networks, Naïve Bayes, decision trees, dimensionality reduction, k-nearest neighbor (kNN), gradient boosting, clustering, and association, but data science models for performing data analytics operations could take other forms and be created in other manners as well. The machine learning models may be trained using a machine learning module 216a that is configured to apply the one or more machine learning techniques to the model(s).

In various aspects, a machine learning model of the data analytics subsystem 216 may be trained by the machine learning module 216a using a reinforcement machine learning program or algorithm, a supervised machine learning program or algorithm, or an unsupervised machine learning program or algorithm. The machine learning program or algorithm may employ, for example, a state-action-reward-state (SARS) algorithm, which may be a state-action-reward-state-action (SARSA) algorithm. In some embodiments, the artificial intelligence and/or machine learning based algorithms, as used to train the model(s) of the data analytics subsystem 216, may be included as a library.

Machine learning as applied to the data analytics subsystem 216 may involve identifying and recognizing patterns in existing data, such as operation data of a sensor-equipped asset, in order to facilitate making predictions or identification for subsequent data (such as outputting predictions related to an operation of the sensor-equipped asset). For example, a machine learning model, such as a machine learning model of the data analytics subsystem 216, as described herein, may be created and trained based upon training data (e.g., operating data and/or other information or data described herein) as inputs or data (which may be termed "features" and "labels") in order to make valid and reliable predictions for new inputs, such as testing level or production level data or inputs (e.g., for outputting predictions related to an operation of a sensor-equipped asset).

Generally speaking, in reinforcement machine learning, a machine learning program operating on a server, computing device, or otherwise processors, is tasked with performing actions (e.g., outputting predictions related to an operation of a sensor-equipped asset) in an environment in order to maximize a cumulative reward. Reinforcement learning does not require labelled input/output pairs be presented, and similarly does not rely upon explicit corrections to sub-optimal actions. Instead, reinforcement learning primarily focuses on determining a balance between exploration of unknown relationships and exploitation of known relationships. Many reinforcement learning algorithms also use dynamic programming techniques, and the environment is typically stated in the form of a Markov decision process (MDP).

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based on the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Reinforcement learning, supervised learning, and/or unsupervised machine learning may also comprise retraining, relearning, or otherwise updating models with new, or different, information, which may include information received, ingested, generated, or otherwise used over time.

The disclosures herein may use one or more of such reinforcement, supervised, or unsupervised machine learning techniques.

It is to be understood that data analytics subsystem 216 may be used to determine predictions related to an operation of a sensor-equipped asset, an aggregate risk value for the sensor-equipped asset, and/or other suitable values or combinations thereof using artificial intelligence (e.g., a machine learning model of data analytics subsystem 216) or, in alternative aspects, without using artificial intelligence. Of course, the data analytics operations carried out by the data analytics subsystem 216 may be embodied in other forms as well.

Further details regarding some example types of data science models that may be created and/or deployed by the data analytics subsystem 216 are set forth in U.S. patent application Ser. No. 16/663,528, which is incorporated herein by reference in its entirety.

Regardless, when the data analytics subsystem 216, and more specifically, the machine learning module 216a has created a new data science model, the asset data platform 210 may store a representation of that data science model in data storage subsystem 222. Thereafter, the data science model can be deployed by data analytics subsystem 216 to analyze real-time operating data of a sensor-equipped asset to output predictions related to an operation of the sensor-equipped asset.

In addition to data science models that are created by data analytics subsystem 216 in the manner described above, asset data platform 210 may also have the capability to deploy other data science models as well. For instance, asset data platform 210 may be pre-provisioned with one or more data science models that are stored in data storage subsystem 222, such as data science models that have previously been created by the platform provider based on other training data that is available to the platform provider, in which case data analytics subsystem 216 may be capable of deploying one or more of these pre-provisioned data science models. Of course, it should be understood that the platform provider may also periodically update asset data platform 210 with additional pre-provisioned data science models as well. As another possibility, asset data platform 210 may provide an interface for importing "custom" data science models that have been previously created outside of asset data platform 210, in which case data analytics subsystem 216 may be capable of deploying one or more of these custom data science models. Data analytics subsystem 216 may be capable of deploying data science models that originate in other manners as well.

Referring again to the functionality of data analytics subsystem 216, the operation of deploying a data science model may be carried out in various manners. According to some embodiments, the operation of deploying a data science model may begin with an initial sequence of configuration functions, which may include (i) creating a new instance of a data science engine (DSE), which is a particular type of platform service that is designed to execute data science models, (ii) configuring the DSE to execute a particular data science model (e.g., a prediction model, an anomaly detection model, etc.), and (iii) establishing one or more pipelines that are configured to transfer data that has been ingested for the model's one or more input data channels from data storage subsystem 222 to the DSE. Thereafter, the DSE may begin executing the data science model based on data that is provided to the DSE via the one or more pipelines and outputting the results of the data science model, which may be stored in data storage subsystem 222.

Referring once more to the functionality of data analytics subsystem 216, while a DSE is executing a data science model and producing model outputs, data analytics subsystem 216 may also derive insights based on results produced by the model. In line with the discussion above, these insights may take various forms, which may depend in part on the type of data science model being executed. Further, in line with the discussion above, the function of deriving insights based on results produced by the model may generally involve (i) evaluating whether each result produced by the model satisfies certain threshold criteria associated with an insight of a given type and (ii) if the threshold criteria is met, creating and storing an object that represents the insight in data storage subsystem 222. However, the function of deriving insights based on results produced by a data science model may take other forms as well. Further, data analytics subsystem 216 may also be configured to perform various other functions that facilitate evaluation of asset-related data using data analytics operations.

Application service subsystem 218 may be configured to create and drive applications that make use of asset-related data ingested into asset data platform 210 via data ingestion subsystem 212 and/or insights generated by asset data platform 210 based on such asset-related data. An application may generally be a software module that is configured to present asset-related data, insights, or the like to a user in various forms and/or take an action responsive to detecting some trigger or other threshold associated with the platform data. An application may also be configured to receive user input, such as user requests and/or user data. Applications may perform other functions as well. Examples of applications may include an asset performance management application, a service optimization application, and/or an asset dealer operations application, among other possibilities.

Application service subsystem 218 may engage in various functionality that facilitates the execution of applications. For instance, in one implementation, application service subsystem 218 may function as a runtime environment for the applications that are available to tenants of asset data platform 210. In this way, application service subsystem 218, in the context of executing an application, may (i) retrieve from the core data storage module 226 a set of platform configuration data that may take the form of application instructions that define the configuration, visual appearance, and/or functionality of an application, (ii) retrieve from the core data storage module 226 certain data called for by the application instructions, such as asset-related data, insights, or the like, and (iii) operate as a renderer by providing some or all of the retrieved data as well as other instructions to a client device (e.g., client station 106A) or other rendering device that defines the visual appearance of the application and/or how the application presents the retrieved data to a user. Application service subsystem 218 may perform various other functions as well.

Interface subsystem 220 of the example asset data platform 210 may generally be configured to make the platform's functional modules accessible to external computing devices. Interface subsystem 220 may do this by providing various APIs, services, or the like, whereby accessing such an API or subscribing to such a service external computing devices may connect to the platform, receive asset-related data and/or insights from asset data platform 210, and/or provide data to asset data platform 210. As examples, asset data platform 210 may be configured to utilize interface subsystem 220 to output asset-related data and/or instructions for receipt by other output modules, such as third-party data platforms, assets, work-order systems, parts-ordering systems, or the like. External computing devices may receive asset-related data and/or insights from asset data platform 210 in other manners as well.

Data storage subsystem 222 may be configured to persistently store all of the different types of data for asset data platform 210, including asset-related data, model results and insights, alerts, and platform configuration data. In practice, this data storage subsystem 222 may comprise multiple different data stores that are configured to store different data sets, and these different data storages could take any of various forms, examples of which may include relational databases (e.g., Online Transactional Processing (OLTP) databases) such as PostgreSQL databases, NoSQL databases (e.g., columnar databases, document databases, key-value databases, graph databases, etc.) such as Apache Cassandra and/or MongoDB databases, file-based data stores such as Apache Hadoop Distributed File System, object-based data stores such as Amazon S3 and/or Azure Blob data stores, data warehouses (which could be based on one or more of the foregoing types of data stores), data lakes (which could be based on one or more of the foregoing types of data stores), and/or message queues (e.g., Apache Kafka), among other possibilities.

As previously mentioned, in certain embodiments, data storage subsystem 222 may comprise (i) a first set of one or more "staging" data stores 224 for storing raw data that is ingested by data ingestion subsystem 212 and (ii) a second set of one or more "core" data stores (e.g., core data store module 226) for storing asset-related data that has been transformed by data transformation subsystem 214, model results and insights that have been derived by data analytics subsystem 216, and/or other data that is generated by asset data platform 210 (perhaps including configuration data for asset data platform 210). Further, the second set of one or more "core" data stores may in turn comprise different subsets of data stores for storing different categories of data, such one subset of data stores that are configured to store readings data and another subset of data stores that are configured to store non-readings data. In this respect, different data store technologies may be utilized for these different categories of data, which may allow for better write and/or read performance. In an example, the core data storage module 226 includes a "readings" data store 226a and a "non-readings" data store 226b. The data stores 226a-b may be configured to store different types of data. As one example, high-volume time-series data readings (such as either instantaneous readings data or staged readings data) may be stored in a "readings" data store 226a that may be specially optimized for high-frequency write operations. On the other hand, low-volume, time-series data or other aperiodic asset-related data may be stored in a "non-readings" data store 226b that may be optimized for other purposes, such as ad-hoc querying or fast-read operations. Other examples are possible as well.

Further details regarding the functional architecture of asset data platform 210 that is shown and described above with reference to FIG. 2B can be found in U.S. patent application Ser. No. 16/633,528, entitled "Data Science Platform" and filed on Oct. 25, 2019, which is incorporated herein by reference in its entirety.

It should also be understood that the functional architecture of asset data platform 210 that is shown and described above with reference to FIG. 2B is merely being presented for purposes of illustration and explanation, and that an asset data platform may have various other functional architectures as well.

III. Example Asset

As discussed above with reference to FIG. 1 and as will be discussed below in more detail with respect to FIG. 2C, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

In addition to the aforementioned components, an asset may also be equipped with a set of on-board components that enable the asset to capture and report operating data. To illustrate, FIG. 2C is simplified block diagram showing some on-board components for capturing and reporting operating data that may be included within or otherwise affixed to an example asset 230, in accordance with various embodiments disclosed herein. As shown, these on-board components may include sensors 231, a processor 232, data storage 233, a communication interface 234, and perhaps also a local analytics device 235, all of which may be communicatively coupled by a communication link 236 that may take the form of a system bus, a network, or other connection mechanism.

In general, sensors 231 may each be configured to measure the value of a respective operating parameter of asset 230 and then output data that indicates the measured value of the respective operating parameter over time. In this respect, the operating parameters of asset 230 that are measured by sensors 231 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 231 may each be configured to measure the value of a respective operating parameter continuously, periodically (e.g., based on a sampling frequency), and/or in response to some triggering event. In this respect, each sensor 231 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 231 may each be configured to output data that indicates the measured value of its respective operating parameter continuously, periodically (e.g., based on a sampling frequency), and/or in response to some triggering event.

Based on the foregoing, it will be appreciated that sensors 231 may take various different forms depending on the type of asset, the type of operating parameter being measured, etc. For instance, in some embodiments, a sensor 231 may take the form of a general-purpose sensing device that has been programmed to measure a particular type of operating parameter. In other embodiments, a sensor 231 may take the form of a special-purpose sensing device that has been specifically designed to measure a particular type of operating parameter (e.g., a temperature sensor, a GPS receiver, etc.). In still other embodiments, a sensor 231 may take the form of a special-purpose device that is not primarily designed to operate as a sensor but nevertheless has the capability to measure the value of an operating parameter as well (e.g., an actuator). In still other embodiments, a sensor 231 may take the form of logic or other program code for producing error codes, where such logic or other program code may or may not be also coupled to or integrated with of any of the foregoing types of sensing devices. Of course, sensors 231 may take other forms as well.

Processor 232 may comprise one or more processor components, such as general-purpose processors, special-purpose processors, programmable logic devices, controllers, and/or any other processor components now known or later developed. In turn, data storage 233 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

Figure 2C:
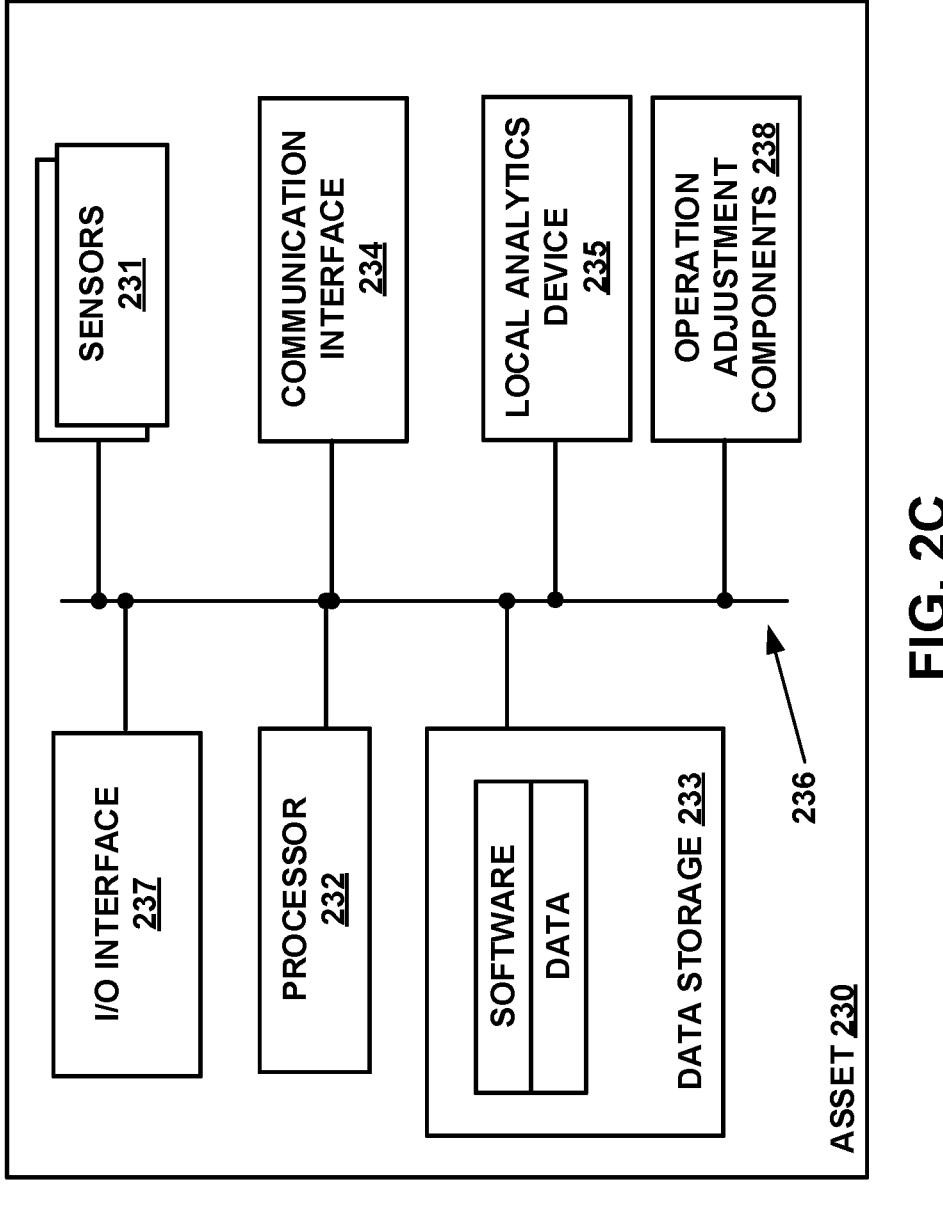
FIG. 2C depicts a simplified block diagram of the on-board components of an example asset, in accordance with various embodiments disclosed herein.

As shown in FIG. 2C, data storage 233 may be arranged to contain executable program instructions (i.e., software) that cause asset 230 to perform various functions related to capturing and reporting operating data, along with associated data that enables asset 230 to perform these operations. For example, data storage 233 may contain executable program instructions that cause asset 230 to obtain sensor data from sensors 231 and then transmit that sensor data to another computing system (e.g., asset data platform 102). As another example, data storage 233 may contain executable program instructions that cause asset 230 to evaluate whether the sensor data output by sensors 231 is indicative of any abnormal conditions at asset 230 (e.g., by applying logic such as threshold-based rules to the measured values output by sensors 231), and then if so, to generate abnormal-condition data that indicates occurrences of abnormal conditions. The executable program instructions and associated data stored in data storage 233 may take various other forms as well.

Communication interface 234 may be configured to facilitate wireless and/or wired communication between asset 230 and various computing systems, including an asset data platform such as asset data platform 102. As such, communication interface 234 may take any suitable form for carrying out these functions, examples of which may include a chipset and antenna adapted to facilitate wireless communication, an Ethernet interface, a serial bus interface (e.g., Firewire, USB 2.0, on-board diagnostics (OBD), etc.), and/or any other interface that provides for wireless and/or wired communication. Communication interface 234 may also include multiple communication interfaces of different types. Other configurations are possible as well. It should also be understood that asset 230 may not be equipped with its own on-board communication interface.

In some circumstances, it may also be desirable to perform certain data analytics operations locally at asset 230, rather than relying on a central platform to perform data analytics operations. Indeed, performing data analytics operations locally at asset 230 may reduce the need to transmit operating data to a centralized platform, which may reduce the cost and/or delay associated with performing data analytics operations at the central platform and potentially also increase the accuracy of certain data analytics operations, among other advantages.

In this respect, in some embodiments, the aforementioned on-board components of asset 230 (e.g., processor 232 and data storage 233) may provide sufficient computing power to locally perform data analytics operations at asset 230, in which case data storage 233 may be provisioned with executable program instructions and associated program data for performing the data analytics operations. However, in other embodiments, the aforementioned on-board components of asset 230 (e.g., processor 232 and/or data storage 233) may not provide sufficient computing power to locally perform certain data analytics operations at asset 230. In such embodiments, asset 230 may also optionally be equipped with local analytics device 235, which may comprise a computing device that is capable of performing data analytics operations and other complex operations that go beyond the capabilities of the asset's other on-board components. In this manner, local analytics device 235 may generally serve to expand the on-board capabilities of asset 230.

Further, asset 230 may additionally include an input/output (I/O) interface 207 that may itself include one or more interfaces providing connectivity with external user-interface equipment (sometimes referred to as "peripherals"). These peripherals may include a keyboard, a mouse or trackpad, a display screen, a touch-sensitive interface, a stylus, a virtual-reality headset, speakers, etc., which may allow for direct user interaction with the on-board components of asset 230.

Moreover, asset 230 may also be equipped with operation adjustment components 238 including hardware and/or software components that enable asset 230 to adjust its operation based on asset-related data and/or instructions that are received at asset 230 (e.g., from asset data platform 102 and/or local analytics device 235). For instance, as one possibility, operation adjustment components 238 may be or include one or more of an actuator, motor, value, solenoid, or the like, which may be configured to alter the physical operation of asset 230 in some manner based on commands received from processor 232. In this respect, data storage 233 may additionally be provisioned with executable program instructions that cause processor 232 to generate such commands based on asset-related data and/or instructions received via communication interface 234. Of course, operation adjustment components 238 may be capable of adjusting its operation in other manners as well.

Figure 2D:
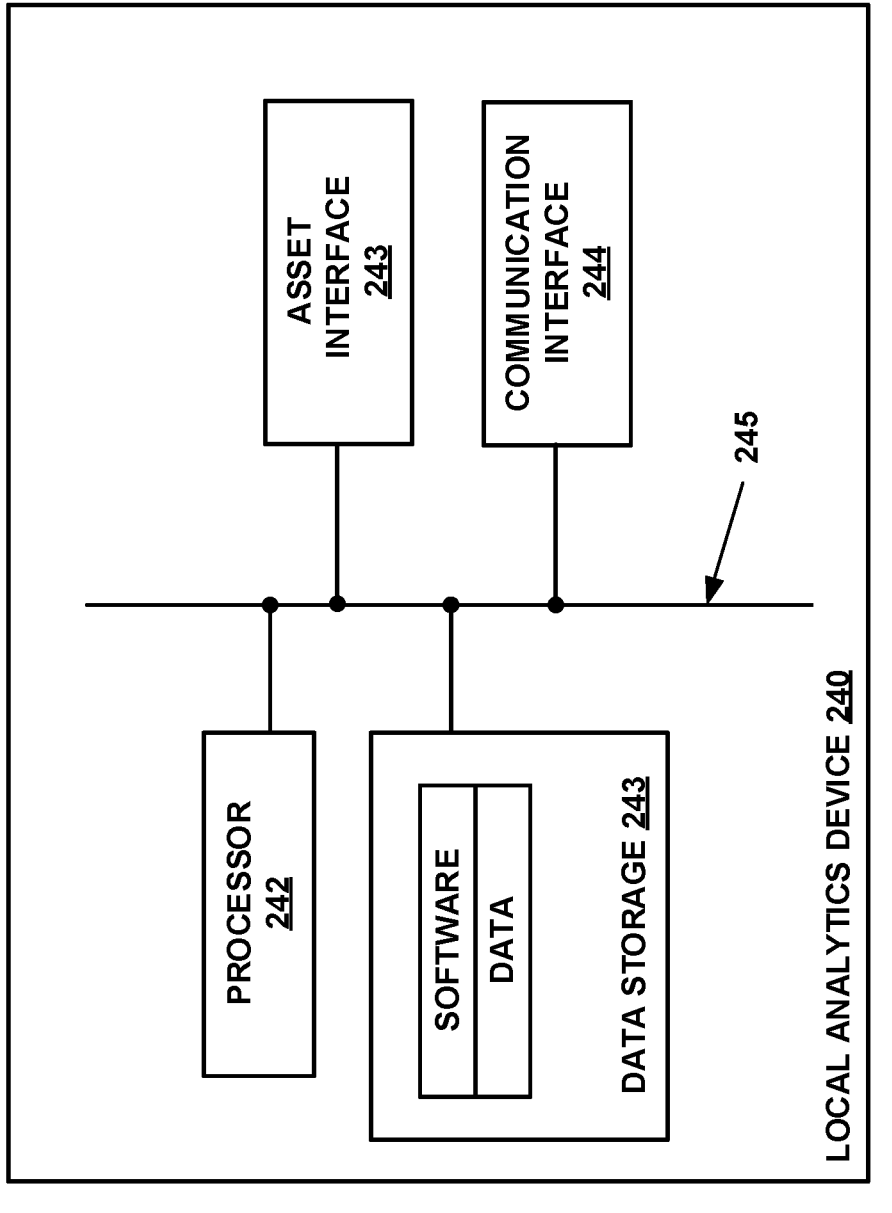
FIG. 2D depicts a simplified block diagram of an example local analytics device, in accordance with various embodiments disclosed herein.

FIG. 2D illustrates a simplified block diagram showing some components that may be included in an example local analytics device 240, in accordance with various embodiments disclosed herein. As shown, local analytics device 240 may include an asset interface 243, a processor 242, data storage 243, and a communication interface 244, all of which may be communicatively coupled by a communication link 245 that may take the form of a system bus, a network, or other connection mechanism.

Asset interface 243 may be configured to couple local analytics device 240 to the other on-board components of asset 230. For instance, asset interface 243 may couple local analytics device 240 to processor 232, which may enable local analytics device 240 to receive data from processor 232 (e.g., sensor data output by sensors 231) and to provide instructions to processor 232 (e.g., to control the operation of asset 230). In this manner, local analytics device 240 may indirectly interface with and receive data from other on-board components of asset 230 via processor 232. Additionally, or alternatively, asset interface 243 may directly couple local analytics device 240 to one or more sensors 231 of asset 230. Local analytics device 240 may interface with the other on-board components of asset 230 in other manners as well.

Processor 242 may comprise one or more processor components that enable local analytics device 240 to execute data analytics programs and/or other complex operations, which may take the form of general-purpose processors, special-purpose processors, programmable logic devices, controllers, and/or any other processor components now known or later developed. In turn, data storage 243 may comprise one or more non-transitory computer-readable storage mediums that enable local analytics device 240 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 2D, data storage 243 may be arranged to contain executable program instructions (i.e., software) that cause local analytics device 240 to perform data analytics operations and/or other complex operations that go beyond the capabilities of the asset's other on-board components, as well as associated data that enables local analytics device 240 to perform these operations.

Communication interface 244 may be configured to facilitate wireless and/or wired communication between local analytics device 240 and various computing systems, including an asset data platform such as asset data platform 102. In this respect, local analytics device 240 may communicate the results of its operations to an asset data platform via communication interface 244, rather than via an on-board communication interface of asset 230. Further, in circumstances where asset 230 is not equipped with its own on-board communication interface, asset 230 may use communication interface 244 to transmit operating data to an asset data platform (e.g., asset data platform 102). As such, communication interface 244 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 244 may also include multiple communication interfaces of different types. Of course, other configurations are possible as well.

In addition to the foregoing, local analytics device 240 may also include other components that can be used to expand the on-board capabilities of an asset. For example, local analytics device 240 may optionally include one or more sensors that are configured to measure certain parameters, which may be used to supplement the sensor data captured by the asset's on-board sensors. Local analytics device 240 may include other types of components as well.

One of ordinary skill in the art will appreciate that FIGS. 2C-D merely show one example of the components of an asset, and that numerous other examples are also possible. For instance, the components of an asset may include additional components not pictured, may have more or fewer of the pictured components, and/or the aforementioned components may be arranged and/or integrated in a different manner. Further, one of ordinary skill in the art will appreciate that two or more of the components of asset 230 may be integrated together in whole or in part. Further yet, one of ordinary skill in the art will appreciate that at least some of these components of asset 230 may be affixed or otherwise added to asset 230 after it has been placed into operation.

IV. Example Operations

As described above, the present disclosure is directed to technology for determination of an aggregated risk value for a sensor-equipped asset, which may take the form of an asset-level risk value and/or a subsystem-level risk value for the sensor-equipped asset, among other possibilities. Broadly speaking, determining such an aggregated risk value may take place on an asset data platform (e.g., asset data platform 102) that includes a set of predictive models. Each predictive model may be trained to receive operating data of a sensor-equipped asset as input and to output a prediction related to an operation of the sensor-equipped asset. In particular, each predictive model may be trained to receive a specific portion of the operating data of a sensor-equipped asset, and to output a prediction related to the operation of the asset based on the specific portion of the operating data.

For example, the asset data platform may apply two predictive models to operating data of a first sensor-equipped asset (e.g., a long-haul truck). The first predictive model may be trained to receive a first portion of the operating data of the asset corresponding to the asset's engine, and the second predictive model may be trained to receive a second portion of the operating data of the asset corresponding to the asset's electronic systems. In this example, the first predictive model may utilize the first portion of the operating data to output a first prediction related to the operation of the asset's engine, and the second predictive model may utilize the second portion of the operating data to output a second prediction related to the operation of the asset's electronic systems. Of course, the predictive models utilized by the asset data platform may correspond to the specific sensor-equipped asset, such that different assets may require different sets of predictive models.

In any event, the predictions output by each individual predictive model may generally represent some corresponding level of risk associated with the operation of the sensor-equipped asset. This level of risk is dependent upon both a severity value and a confidence value associated with the prediction. However, as previously described, conventional techniques fail to accurately and consistently evaluate risk levels for asset operation in a manner that reflects the genuine severity and/or the confidence associated with the risk levels. Such conventional techniques generally suffer at least from a lack of prediction aggregation across different models, as well as an inability for risk level customization on an operator-by-operator basis. Thus, in general, conventional techniques determine an overall risk for an asset in a manner that is inaccurate, and thereby undesirable.

By contrast, the systems and methods of the present disclosure alleviate these, and other, issues with conventional techniques by intelligently aggregating outputs from multiple predictive models. In particular, the systems and methods of the present disclosure utilize predictions output by multiple different predictive models in conjunction with a risk dataset to determine an aggregated risk value for a sensor-equipped asset, as further described herein. The risk dataset may include confidence levels, severity levels, and risk values, a portion of which may be customizable by individual operators. Thus, this aggregated risk value determination process aggregates predictions across multiple different models, allows operators to prioritize high-risk assets, and enables operators to customize portions of the risk levels, such that the systems and methods of the present disclosure improve over conventional techniques.

To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

A. Configuration Phase

Figure 3:
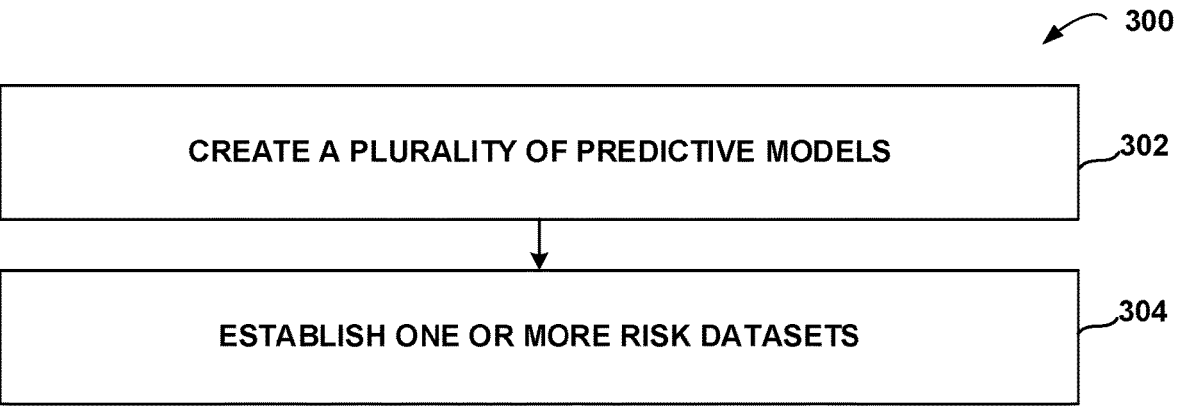
FIG. 3. depicts a flow diagram showing some example operations carried out by a platform prior to determining risk values for assets, in accordance with various embodiments disclosed herein.

As noted above, the disclosed technology for determining aggregated risk values uses the rendered predictions of a set of predictive models and a pre-established risk dataset to determine an aggregated risk value for an asset. Prior to utilizing the disclosed technology, there will generally be a configuration phase where the predictive models are created and the risk dataset is established. FIG. 3 is one example of such a configuration phase that may be carried out in accordance with the disclosed technology prior to determining aggregated risk values for assets. For purposes of illustration only, example process 300 is described as being carried out by asset data platform 210 of FIG. 2B, but it should be understood that example process 300 may be carried out by computing platforms that take other forms as well. Further, it should be understood that, in practice, the functions described with reference to FIG. 3 may be encoded in the form of program instructions that are executable by one or more processors of asset data platform 210. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment. In an example, process 300 is carried out by data analytics subsystem 216 of asset data platform 210, and more specifically, at least partially by the machine learning module 216a.

The example process 300 may begin at block 302, where asset data platform 210 creates a plurality of predictive models. Each respective predictive model that is created by asset data platform 210 may be configured to (i) evaluate at least a respective portion of the operating data for the sensor-equipped asset and (ii) output a respective prediction related to an operation of the sensor-equipped asset, each respective prediction having respective confidence value and a respective severity value.

In general, a confidence value may be a value representing the likelihood that a prediction rendered by a predictive model is correct. Any suitable confidence values and/or number of available confidence values may be utilized. In accordance with the present disclosure, a confidence value for a prediction output by a predictive model may be selected from some universe of predefined confidence values that are available for assignment to predictions. Further, the manner in which confidence values are represented may take various forms. In an example, confidence values may be represented with numerical indicators (e.g., a scale of 0 to 5, a scale of 0 to 10, or a scale of 0 to 100, among other possibilities). In another example, confidence values may be represented with textual indicators (e.g., "Definite," "Extremely High," "Very High," "High," "Medium," "Low," and so forth). Of course, other examples are possible as well. In practice, the confidence values may be defined by the provider of the asset data platform 210, the users of asset data platform 210, or some combination thereof, among other possibilities.

Moreover, a prediction's associated confidence value may generally represent the likelihood that the particular prediction is correct, and the confidence value may be represented in any suitable format. For example, a first asset (e.g., a pickup truck) may have two predictions corresponding to the asset's radiator and the asset's alternator. The first prediction may have a corresponding confidence value of 85%, indicating that the prediction relating to the operation of the asset's radiator is likely correct. The second prediction may have a corresponding confidence value of 15%, indicating that the prediction relating to the operation of the asset's alternator is likely incorrect.

Further, in certain embodiments, a prediction's associated confidence value may change over time to reflect the changing confidence associated with the prediction as time passes. In these embodiments, the confidence value may have a corresponding time value representing the amount of time that has passed since the prediction was made. For example, a confidence value corresponding to an engine failure for a first asset may initially be 90% at the time of prediction. However, several days later, a user may access the prediction, and may receive a confidence value of 75% for the engine failure and an indication that several days have passed since the prediction was generated. The confidence value may be displayed to a user with a numerical representation of the number of days since the prediction was generated (e.g., 0-1 days, 1-2 days, etc.). In this manner, the passage of time may serve as a proxy for the confidence value, and may more accurately represent the up-to-date confidence of the prediction over time.

In general, a severity value may be a value representing how severely an asset's operation is expected to be impacted if the type of potential event for which a predictive model is rendering predictions were to occur at the asset (i.e., how critical the event is expected to be). Any suitable categories of severity values and/or number of available severity values may be utilized. In accordance with the present disclosure, a severity value for a prediction related to the sensor-equipped asset's operation may be selected from some universe of predefined severity values that are available for assignment to predictions. Such severity values may take any of various forms.

For example, the severity values in the universe of predefined severity values that are available for assignment to each predictive model's predictions may include one or more "high" (or "critical") severity values used to indicate event types that are expected to have a significant impact on an asset's operation (e.g., an event type that is expected to render an asset inoperable), one or more "intermediate" severity values used to indicate event types that are expected to have a moderate impact on an asset's operation (e.g., an event type that is expected to limit an asset's operation but not render it inoperable), and/or one or more "low" severity values used to indicate event types that are expected to have minimal impact on an asset's operation, among other possibilities. Further, the manner in which the set of severity values is represented may take various forms, examples of which include a set of textual indicators (e.g., "High," "Medium," "Low," etc.), a scale of numerical indicators, or the like. In practice, the set of severity values may be defined by the provider of the asset data platform 210, the users of asset data platform 210, or some combination thereof. In some embodiments, the set of severity values is defined by the provider of the platform, so that severity values are consistent across all users of the platform and determined severity of predictions is not influenced by different risk tolerances of different users of the platform. Moreover, and as will be described further herein, a customized risk dataset may be implemented by asset data platform 210 so as to take into account different risk tolerances of different users of the platform.

Continuing the prior example, the first asset (e.g., the pickup truck) may have two additional predictions corresponding to the asset's engine overheating and the asset's taillight being broken. The first prediction may have a corresponding severity value of critical, indicating that the event type of the engine overheating is expected to have a significant impact on the asset's operation. The second prediction may have a corresponding severity value of low/negligible, indicating that the event type of the tailing being broken is expected to have a minimal/negligible impact on the asset's operation.

A prediction's associated confidence value and severity value may be represented/embodied in various ways. In an example, a prediction's associated confidence value and severity value could be output by the predictive model itself. In another example, a prediction's associated confidence value and severity value could be determined by asset data platform 210 based on the model's indication of the prediction. In some embodiments, any of the confidence value, the severity value, and/or the corresponding severity level may be determined separately from the predictive model(s). For example, the predictive model may output a prediction related to a type of operational event that could potentially occur at the asset, and the asset data platform and/or any other suitable device may incorporate feedback from a user (e.g., a subject matter expert) stating "there is an X % likelihood of the asset failing as predicted" for display to the user requesting the prediction.

In any event, a class of predictive models may be created for use in determining an aggregated risk value. In general, each predictive model in the class of predictive models may receive a respective set of data (i.e., values for a respective set of input variables) related to operation of a particular asset. Further, each predictive model may, based on an evaluation of the respective set of data, output a prediction related to a given type of operational event that could potentially occur at the asset. Still further, each predictive model may output an indication of the prediction that has an associated confidence value and a severity value.

Various types of predictions could be rendered by this class of predictive models. As one possibility, a prediction may be a prediction related to whether a given type of event has already occurred at an asset. For example, a prediction related to whether a given type of event has already occurred at an asset could be represented in terms of a binary indication of whether or not the event is predicted to have occurred or a likelihood value, among other possibilities.

As another possibility, a prediction may be a prediction related to whether a given type of event is expected to occur at an asset in the foreseeable future. For example, a prediction related to related to whether a given type of event is expected to occur at an asset in the foreseeable future could be represented in terms of a binary indication of whether or not the event is predicted to occur in the foreseeable future, a likelihood value, or a length of time value, among other possibilities.

The class of predictive models for use in determining an aggregated risk value may include various kinds of predictive models.

As one possibility, an example type of predictive model may take the form of a machine-learning (ML) model that predicts whether a given type of event has already occurred at an asset. Such a predictive model may be created/trained by a machine learning module (e.g., machine learning module 216a), and may be trained using any suitable ML technique. Moreover, the predictive model may be trained using a training data set that includes a plurality of operating data of a sensor-equipped asset to output a plurality of training predictions related to an operation of the asset. For example, a first predictive model may be intended (i.e., in an untrained state) to output predictions related to an engine of an asset. The first predictive model may be trained using a training data set that includes a plurality of operating data of the asset related to the engine (e.g., average revolutions per minute (RPM), temperature, etc.), in order to output a corresponding plurality of predictions related to the operation of the engine. Thereafter, the first predictive model may be utilized to receive real-time operating data associated with the operation of the asset's engine and output a prediction related to the operation of the asset's engine.

Accordingly, such a predictive model may be configured to receive operating data (e.g., real-time and/or recent operating data) of an asset as inputs and to output a prediction related to the operation of the asset. The prediction related to the operation of the asset may be or include any suitable indication related to the likelihood that a particular event has occurred at an asset. For example, a first predictive model may be configured to receive real-time operating data associated with the operation of the asset's brakes and output a binary prediction that includes a binary indication related to whether or not the type of event associated with the asset's brakes (e.g., excessive wear, failure, etc.) has occurred at the asset. Additionally, or alternatively, the first predictive model may be configured to output a non-binary prediction that includes a non-binary indication of a likelihood of whether or not the type of event associated with the asset's brakes has occurred at the asset. Namely, the binary indication may include a textual indication that an event "has occurred" or "has not occurred", while the non-binary indication may include a textual indication that an event "is X % likely to have occurred", where X is a numerical value between 0 and 100.

Regardless, each prediction output by the ML prediction models may include a confidence value and a severity value. As previously mentioned, the confidence value may be a predicted likelihood that a particular event or event type has occurred at an asset, and may be expressed as a numerical value (e.g., 90%, 5%, etc.), an alphanumeric string (e.g., high probability, low probability, etc.), a color-coding (e.g., red is high probability, green is low probability), and/or in any other suitable manner or combinations thereof. Further, the severity value may be an indication of how severely the operation of the asset may be impacted based on the nature of the event or event type having occurred at the asset.

In certain embodiments, the non-binary indication may also include the confidence value, such that the non-binary indication may include a textual indication that an event "it is 80% likely that the brakes are excessively worn" or "it is 10% likely that the brakes have failed". Thus, in these embodiments, the non-binary prediction model may output a non-binary indication that includes the confidence value.

As another possibility, an example type of predictive model may take the form of a machine-learning model that predicts whether a given type of event is likely to occur at an asset within some window of time in the future (e.g., 1 week, 2 weeks, etc.). Such a predictive model may be created/trained by a machine learning module (e.g., machine learning module 216a), and may be trained using any suitable ML technique. Moreover, the predictive model may be trained using a training data set that includes a plurality of operating data of a sensor-equipped asset to output a plurality of training predictions related to an operation of the asset at some future time period. For example, a first predictive model may be intended (i.e., in an untrained state) to output predictions related to an engine of an asset. The first predictive model may be trained using a training data set that includes a plurality of operating data of the asset related to the engine (e.g., average revolutions per minute (RPM), temperature, etc.), in order to output a corresponding plurality of predictions related to the operation of the engine at a first training future time period. Thereafter, the first predictive model may be utilized to receive real-time operating data associated with the operation of the asset's engine and output a prediction related to the operation of the asset's engine at a first future time period.

Accordingly, such a predictive model may be configured to receive operating data (e.g., real-time and/or recent operating data) of an asset as inputs and to output a prediction related to the operation of the asset at a future time period. The prediction related to the operation of the asset may be or include any suitable indication related to the likelihood that a particular event may occur at an asset during the future time period. For example, a first predictive model may be configured to receive real-time operating data associated with the operation of the asset's brakes and output a binary prediction that includes a binary indication related to whether or not the type of event associated with the asset's brakes (e.g., excessive wear, failure, etc.) may occur at the asset during the future time period. Additionally, or alternatively, the first predictive model may be configured to output a non-binary prediction that includes a non-binary indication of a likelihood of whether or not the type of event associated with the asset's brakes may occur at the asset during the future time period. Namely, the binary indication may include a textual indication that an event "will occur" or "will not occur" during the future time period, while the non-binary indication may include a textual indication that an event "is X % likely to occur" during the future time period.

Regardless, each prediction output by the ML prediction models may include a confidence value and a severity value. The confidence value may be a predicted likelihood that a particular event or event type may occur at an asset during the future time period, and may be expressed as a numerical value (e.g., 90%, 5%, etc.), an alphanumeric string (e.g., high probability, low probability, etc.), a color-coding (e.g., red is high probability, green is low probability), and/or in any other suitable manner or combinations thereof. Further, the severity value may be an indication of how severely the operation of the asset may be impacted based on the nature of the event or event type potentially occurring at the asset during the future time period.

In certain embodiments, the non-binary indication may also include the confidence value, such that the non-binary indication may include a textual indication that an event "it is 80% likely that the brakes are going to be excessively worn by next week" or "it is 10% likely that the brakes may fail by next month". Thus, in these embodiments, the non-binary prediction model may output a non-binary indication that includes the confidence value.

As yet another possibility, an example type of predictive model may take the form of a survival analysis model that predicts whether a given type of event is likely to occur at an asset within the foreseeable future. Such a predictive model may be created/trained by a data analytics subsystem (e.g., data analytics subsystem 216), and may be created using any suitable statistical technique(s). Moreover, the predictive model may be configured to output predictions related to an operation of the asset. The training predictions may include indications of whether or not a particular event or event type is predicted to occur at an asset within a future time period and/or an expected occurrence time for the event or event type.

For example, a first predictive model may be intended (i.e., in an untrained state) to output predictions related to oil (e.g., motor oil) used within an asset. The first predictive model may receive operating data related to the oil (e.g., time since last oil change, temperature, etc.), in order to output a prediction related to the operation of the oil within a first future time period and/or an expected occurrence time for the oil to require replacement. In this example, the first predictive model may receive operating data related to the oil in an asset, and may output a prediction indicating that the oil is unlikely to require replacement within the next month, and/or that the oil should likely be replaced three months from the current time.

Regardless, each prediction output by the survival prediction models may include a confidence value and a severity value. The confidence value may be a predicted likelihood that a particular event or event type may occur at an asset during the expected occurrence time, and may be expressed as a numerical value (e.g., 90%, 5%, etc.), an alphanumeric string (e.g., high probability, low probability, etc.), a color-coding (e.g., red is high probability, green is low probability), and/or in any other suitable manner or combinations thereof. Further, the severity value may be an indication of how severely the operation of the asset may be impacted based on the nature of the event or event type potentially occurring within the foreseeable future, such as during the expected occurrence time.

In certain embodiments, an example type of predictive model may take the form of an anomaly detection model that predicts whether a given type of event (anomalous operation) has already occurred at an asset. Additionally, or alternatively, the predictive model(s) may be or include a rules-based model that predicts whether a given type of event has already occurred at an asset and/or is likely to occur at an asset within the foreseeable future. Such predictive models may be created by the data analytics subsystem (e.g., data analytics subsystem 216), and/or may include a set of rules that may be defined based on input from various users (e.g., operators, analysts, subject-matter experts) and/or analysis of historical operating data. These predictive models may output predictions that indicate whether or not a particular event type has occurred at an asset, and/or whether or not the event type may occur at the asset within a future time period. Of course, other exemplary types of predictive models are possible as well.

Returning to FIG. 3, at block 304, asset data platform 210 may establish one or more risk datasets that may be used to assign risk values to predictions output by the set of models. Each risk dataset may define (i) a first set of confidence levels, (ii) a second set of severity levels, and (iii) a respective risk value for each respective pairing of a given confidence level from the first set and a given severity level from the second set. The risk dataset may be defined by the provider of the asset data platform 210, the users of asset data platform 210, or some combination thereof, among other possibilities. In a primary implementation, the risk dataset is defined by the users of asset data platform, so that the users may customize the risk dataset based on the risk tolerance of the entities to which the users are associated.

In general, any suitable confidence levels may be utilized. The confidence levels may be levels from a categorization of the confidence values discussed above with respect to block 302. In an example, the confidence levels may each include a given range of confidence values. For instance, in an example where the confidence values are represented on a scale of 0 to 100, the confidence levels may include a first confidence level including the range of 0 to 20 (exclusive) (i.e., [0, 20)), a second confidence level including the range of 20 to 40 (exclusive) (i.e., [20, 40)), a third confidence level including the range of 40 to 60 (exclusive) (i.e., [40, 60)), a fourth confidence level including the range of 60 to 80 (exclusive) (i.e., [60, 80)), and a fifth confidence level including the range of 80 to 100 (inclusive) (i.e., [80, 100]). Of course, other confidence levels are also possible.

The second set of severity levels may correspond to the severity values output by the predictive models. As discussed above, a severity value may be a value from a predefined categorization of impact severity, where the value provides an indication of how severely an asset's operations is expected to be impacted by an occurrence of an event associated with the prediction related to the sensor-equipped asset's operation (i.e., how critical the event is expected to be). The severity levels within a given risk dataset may correspond to the severity values available for assignment to predictions of the predictive models. For instance, in an example where the severity values output by the set of predictive models include a first severity value of "Negligible," a second severity value of "Marginal," a third severity value of "Critical," and a fourth severity value of "Catastrophic." the second set of severity levels within a risk dataset may likewise include a first severity level of "Negligible," a second severity level of "Marginal," a third severity level of "Critical," and a fourth severity level of "Catastrophic." Of course, other examples are also possible.

As mentioned above, each risk dataset may define a respective risk value for each respective pairing of a given confidence level from the first set and a given severity level from the second set. In general, the risk value may be intended to covey the importance of a prediction. Any suitable risk values may be utilized. For example, the risk values may include one or more "high" risk values used to indicate a significant risk associated with a prediction(s) for a sensor-equipped asset, one or more "intermediate" risk values used to indicate a moderate risk associated with a prediction(s) for a sensor-equipped asset, and/or one or more "low" risk values used to indicate a minimal risk associated with a prediction(s) for a sensor-equipped asset, among other possibilities. Further, the manner in which the set of risk values is represented may take various forms, examples of which include a set of textual indicators (e.g., "Very High," "High," "Medium," "Low," "Very Low," etc.), a scale of numerical indicators, or the like. The set of risk values may include other types of values and/or take various other forms as well.

Figure 4:
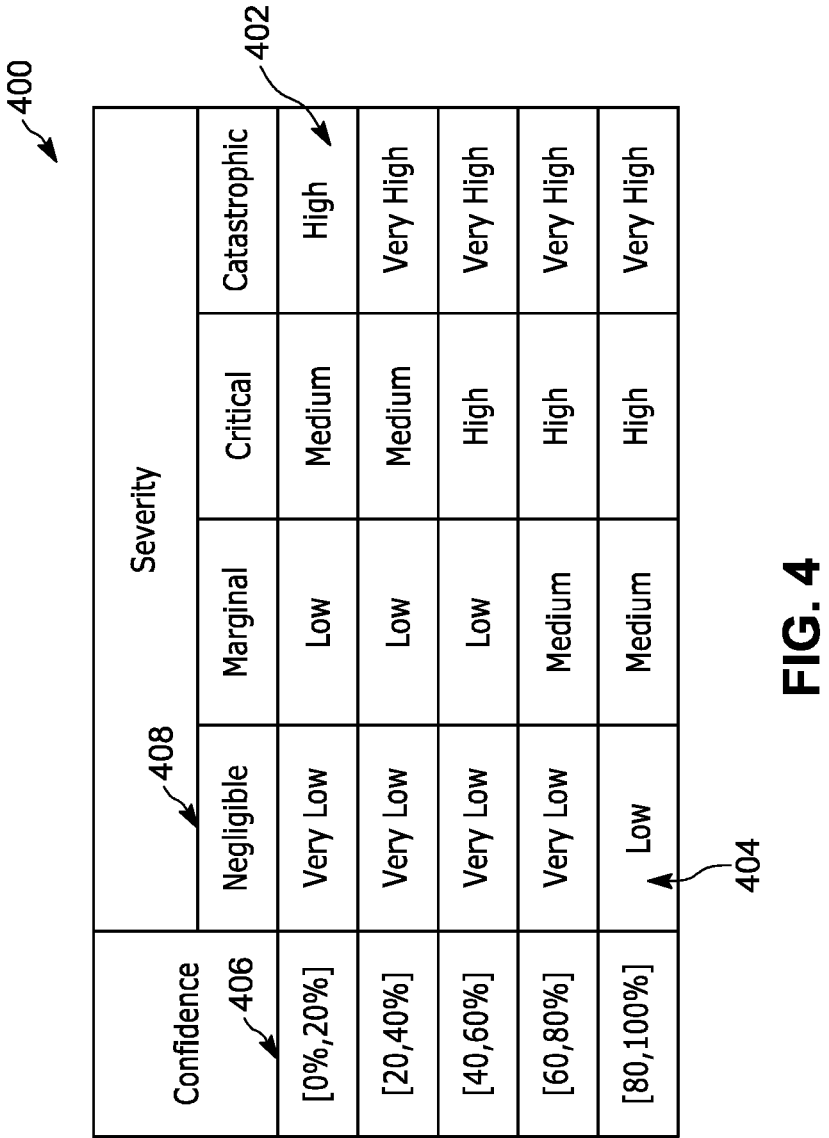
FIG. 4 depicts an example pre-established risk dataset, in accordance with various embodiments disclosed herein.

FIG. 4 illustrates an example risk dataset 400 that takes the form of a risk matrix. In the example of FIG. 4, there is a respective risk value 402 for each respective pairing 404 of a given confidence level 406 from the first set and a given severity level 408 from the second set. In this example, the confidence levels include a first confidence level including the range of 0 to 20 (exclusive) (i.e., [0, 20)), a second confidence level including the range of 20 to 40 (exclusive) (i.e., [20, 40)), a third confidence level including the range of 40 to 60 (exclusive) (i.e., [40, 60)), a fourth confidence level including the range of 60 to 80 (exclusive) (i.e., [60, 80)), and a fifth confidence level including the range of 80 to 100 (inclusive) (i.e., [80, 100]). Further, the severity levels 408 (which as described above may correspond to the severity values available for assignment to predictions) include a first severity level of "Negligible," a second severity level of "Marginal," a third severity level of "Critical," and a fourth severity level of "Catastrophic." Still further, (i) the pairs of "[0%, 20%)" and "Negligible." "[20, 40%)" and "Negligible." "[40, 60%)" and "Negligible," and "[60, 80%)" and "Negligible" each have a risk value 402 of "Very Low," (ii) the pairs of "[80, 100%)" and "Negligible," "[0%, 20%)" and "Marginal," "[20, 40%)" and "Marginal," "[40, 60%)" and "Marginal" each have a risk value 402 of "Low," (iii) the pairs of "[60, 80%)" and "Marginal," "[80, 100%)" and "Marginal." "[0%, 20%)" and "Critical," and "[20, 40%)" and "Critical" each have a risk value 402 of "Medium" (iv) the pairs of "[40, 60%)" and "Critical," "[60, 80%)" and "Critical," "[80, 100%)" and "Critical." and "[0%, 20%)" and "Catastrophic" each have a risk value 402 of "High," and (v) the pairs of "[20, 40%)" and "Catastrophic." "[40, 60%)" and "Catastrophic." "[60, 80%)" and "Catastrophic." and "[80, 100%] and "Catastrophic" each have a risk value 402 of "Very High." Of course, other example risk datasets are also possible.

The one or more risk datasets may be established in various ways. As one possibility, a risk dataset may be established based on user input. In certain embodiments, the confidence levels and/or pairings of confidence levels with risk levels are user configurable. For example, a company may customize these risk values to their preferences and opinions. This allows for informative risk assessment that accounts for (i) prediction confidence as well as (ii) company preferences. In some examples, asset data platform 210 may define one or more pre-established risk datasets, and asset data platform may establish a risk dataset for the given user based on a user selection of a given pre-established risk dataset from among a set of pre-established risk datasets. In order to facilitate establishing a risk dataset based on user input, the asset data platform 210 may be configured to cause a client device to present an interface for establishing the risk dataset.

As another possibility, a risk dataset may be established automatically based on defaults. For example, in a situation where a given user does not elect to define a customized risk dataset, the asset data platform (e.g., asset data platform 102) may establish a risk dataset for the given user based on one or more pre-established risk datasets. Of course, other examples are also possible.

In practice, the risk importance of a prediction may depend on both the prediction's associated confidence value and on company preferences. For instance, different companies can have differing opinions about the risk associated with predicted problems. For example, a first company may believe that a prediction with a "Marginal" severity value and a 99% confidence value may present a "Low" risk, a second company may believe that a prediction with a "Marginal" severity value and a 99% confidence value may present a "Medium" risk, and a third company may believe that a prediction with a "Marginal" severity value and a 99% confidence value may present a "High" risk. In any event, customized risk datasets may be implemented by asset data platform 210 to take into account different risk tolerances of different users of the platform. By allowing users to customize risk datasets based on the risk tolerance of the entities to which the users are associated, the risk values for the predictions may more closely align to the risk tolerance of the particular entities utilizing the asset data platform.

B. Execution Phase

After creating the set of predictive models and establishing at least one risk dataset to apply to the outputs of the predictive models (e.g., a risk dataset for a given entity that utilizes the asset data platform to monitor the operation of assets), asset data platform 210 may use these predictive models and at least one risk dataset to determine aggregated risk values for sensor-equipped assets.

FIG. 5 depicts a flow diagram of an example method 500 for determining an aggregated risk value for an asset, in accordance with various embodiments disclosed herein. For purposes of illustration only, example method 500 is described as being carried out by asset data platform 210 of FIG. 2B, but it should be understood that example method 500 may be carried out by computing platforms that take other forms as well. Further, it should be understood that, in practice, the functions described with reference to FIG. 5 may be encoded in the form of program instructions that are executable by one or more processors of asset data platform 210. Further yet, it should be understood that the disclosed method 500 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

At block 502, asset data platform 210 may output predictions related to the operation of a sensor-equipped asset by applying a group of predictive models to data related to the operation of a sensor-equipped asset, where each respective predictive model in the group of predictive models is configured to (i) evaluate a respective portion of the operating data for the sensor-equipped asset and (ii) output a respective prediction related to the sensor-equipped asset's operation and having an associated respective confidence value and an associated respective severity value.

The given set of predictive models that are executed for the given asset may depend on certain characteristics of the asset, such as the type of the asset, the model of asset, and/or the particular subsystems and/or components included within the asset, among other possibilities.

Further, in line with the discussion above, the group of predictive models that are executed for the sensor-equipped asset either may comprise a group of predictive models that are all of the same type (e.g., a group of machine learning models that are each configured to predict whether a respective type of operational event is likely to occur at an asset within the foreseeable future) or may comprise a group of predictive models that are of different types. As an example, the set of predictive models that are executed for the sensor-equipped asset may comprise at least two different types of models, such as a first subset of predictive models comprising machine learning models that are each configured to predict whether a respective type of operational event is likely to occur at sensor-equipped asset within the future time period and a second subset of predictive models comprising survival analysis models and/or rules-based models that are each configured to predict whether a given type of event is likely to occur at sensor-equipped asset within the future time period.

Additionally, or alternatively, the group of predictive models that are executed for the sensor-equipped asset may comprise one or more of the other types of predictive models discussed above. Further, it should be appreciated that the asset data platform 102 may iteratively apply the predictive models to generate predictions related to the operation of a sensor-equipped asset, such as according to a pre-determined schedule (e.g., weekly, daily, hourly, etc.) and/or each time a triggering event is detected (e.g., new operating data is received for an asset). This iterative application of the predictive models may also generate predictions that may be stored in memory for future use by the asset data platform, such as training and/or re-training ML predictive models or creating new statistical/rules-based predictive models.

At block 504, asset data platform 210 may detect a triggering event for determining an aggregated risk value for the sensor-equipped asset. In general, any suitable triggering event for determining at least one aggregated risk value for the sensor-equipped asset may be used, and the triggering events may take various forms. As one example, a triggering event for determining at least one aggregated risk value for the sensor-equipped asset may be a specific request to access the risk information for the asset (e.g., a user request to view the risk information for the asset). As another example, a triggering event for determining at least one aggregated risk value for the sensor-equipped asset may be detecting that new predictions are available. As yet another example, a triggering event for determining at least one aggregated risk value for the sensor-equipped asset may be defined according to a defined schedule (e.g., update every X minutes, every X hours, every X days, and so forth).

Further, the aggregated risk value for the sensor-equipped asset may have various levels of granularity. For example, the aggregated risk value may be an asset-level aggregated risk value. In such an example, the given set of predictive models may include predictive models related to a plurality of subsystems of the sensor-equipped asset. For instance, a given asset may include five different subsystems of the give sensor-equipped asset, and the given set of predictive models may include (i) one or more predictive models related a first subsystem, (ii) one or more predictive models related a second subsystem, (iii) one or more predictive models related a third subsystem, (iv) one or more predictive models related a fourth subsystem, and (v) one or more predictive models related a fifth subsystem.

As another example, the aggregated risk value may be a subsystem-level aggregated risk value. In such an example, the given set of predictive models may include predictive models related to a given subsystem of the give sensor-equipped asset. For instance, a given asset may include five different subsystems of the give sensor-equipped asset, and the given set of predictive models may include one or more predictive models related to one of those subsystems (e.g., a first subsystem).

At block 506, in response to detecting the triggering event for determining at least one aggregated risk value for the sensor-equipped asset, asset data platform 210 may identify (i) a set of predictions related to the operation of the sensor-equipped asset that is to be utilized for determining the at least one aggregated risk value of the sensor-equipped asset and (ii) a risk dataset that is to be utilized for determining the at least one aggregated risk value of the sensor-equipped asset.

The set of predictions and the risk dataset may each take various forms. Namely, the set of predictions may be or include at least a subset of the predictions output by the set of prediction models at block 504. For example, the set of predictions for a first asset may include some/all predictions output by the set of predictive models indicating that a particular event or event type has occurred and/or will occur at a future time period. Of course, each prediction of the set of predictions may include a respective confidence value and a respective severity value, such that each prediction may correspond to a risk value in the risk dataset. Continuing the prior example, a first prediction corresponding to the first asset may include a respective confidence value of 75% and a respective severity value of "critical". Based on this confidence value and the severity value, the first prediction may have a corresponding risk value of "high" (e.g., as shown in FIG. 4).

In some examples, asset data platform 210 determines a corresponding risk value for each of the respective predictions rendered by the set of predictive models. In other examples, asset data platform 210 determines a corresponding risk value for each prediction of a subset of the respective predictions. For instance, rather than determining a corresponding risk value for each of the respective predictions rendered by the set of predictive models, asset data platform 210 may determine a corresponding risk value for each prediction having a confidence value that satisfies a threshold value. The threshold value may be any suitable threshold or combinations of thresholds, such as a threshold value of at least 10%. In practice, the threshold value may be defined by the provider of the asset data platform 210, the users of asset data platform 210, or some combination thereof. Further yet, the threshold value may vary based on factors such as the type of model to which the threshold is applied, the type of asset for which the prediction is being made, and/or the type of problem to which the prediction applies, among other possibilities.

The risk dataset may be a pre-established risk dataset that defines (i) a first set of confidence levels, (ii) a second set of severity levels, and (iii) a respective risk value for each respective pairing of a confidence level from the first set and a severity level from the second set. One example is the risk dataset shown in FIG. 4. The risk dataset may be identified in various ways. For instance, in some examples, asset-data platform 210 may identify the risk dataset by evaluating the entity (e.g., organization) for which the risk value is being determined.

At block 508, asset data platform 210 may then determine the aggregated risk value of the sensor-equipped asset based on the set of predictions and the risk dataset. This function may take various forms. In an example, asset-data platform 210 may group predictions based on severity level. Asset-data platform 210 may then evaluate each severity level's corresponding predictions in order to determine a respective severity-specific risk value. This evaluation to determine a respective severity-specific risk value may result in 1 of 3 possible scenarios.

In a first possible scenario, there may be no predictions corresponding to severity level. In this case, severity level is ignored for purposes of determining aggregated risk. Or put another way, the severity-specific risk value may be or represent no risk.

In a second possible scenario, there may be a single prediction corresponding to severity level. In this case, a first step is to determine a severity-specific confidence value that corresponds to (or matches) the one prediction's associated confidence value. Next, asset-data platform 210 may use the risk dataset to map the severity-specific confidence value to a severity-specific risk value. For instance, in an example where the pre-established risk dataset is pre-established risk dataset 400 of FIG. 4, asset data platform 210 may map the severity-specific confidence value to its corresponding risk value 404. In particular, such mapping would involve (i) asset data platform 210 determining that a the severity-specific confidence value having a confidence between 0% and 20% and a severity value of "Negligible" has a corresponding risk value of "Very low," (ii) asset data platform 210 determining that a the severity-specific confidence value having a confidence between 20% and 40% and a severity value of "Negligible" has a corresponding risk value of "Very low," (iii) asset data platform 210 determining that a the severity-specific confidence value having a confidence between 40% and 60% and a severity value of "Negligible" has a corresponding risk value of "Very low," and so forth.

In a third possible scenario, there may be multiple predictions corresponding to severity level. In this case, a first step is to determine a severity-specific confidence value that corresponds to an aggregate of multiple predictions' associated confidence values. Asset-data platform 210 may aggregate the multiple predictions' associated confidence values in various ways, an example of which is described in greater detail below. Then asset-data platform 210 may use the risk dataset to map the severity-specific confidence value to a severity-specific risk value (e.g., as described above with respect to the second scenario).

As a result of the above functionality, the asset data platform may determine one or more severity-specific risk values. Based on these one or more severity-specific risk values, asset-data platform 210 may determine the aggregated risk value. The functionality of determining the aggregated risk value on the one or more severity-specific risk values that have been determined may take various forms. For instance, asset-data platform 210 may pick the highest of the one or more severity-specific risk values and treat that highest severity-specific risk value as the aggregated risk value.

In other examples, asset-data platform 210 may aggregate the one or more severity-specific risk values by, for each respective severity level in the second set of severity levels, identifying which of the respective predictions rendered by the set of predictive models have an associated severity value that corresponds to the respective severity level. Asset data platform 210 may then, for each respective severity level having one or more respective predictions identified: (i) determine a severity-specific confidence level by either: (a) if one of the respective predictions is identified, determining that the respective severity level having one or more respective predictions identified has a severity-specific confidence level that corresponds to the one respective prediction's associated confidence value; or (b) if two or more of the respective predictions are identified, determining that the respective severity level having one or more respective predictions identified has a severity-specific confidence level that corresponds to an aggregation of the two or more respective predictions' associated confidence values; and (ii) based on the severity-specific confidence level determined for the respective severity level having one or more respective predictions identified and the pre-established risk dataset, determine a severity-specific risk value for the respective severity level.

As mentioned above, asset-data platform 210 may aggregate the multiple predictions' associated confidence values in various ways. In an example, if two or more of the respective predictions are identified for a respective severity level having one or more respective predictions identified, determining that the respective severity level having one or more respective predictions identified has a severity-specific confidence level that corresponds to an aggregation of the two or more respective predictions' associated confidence values may involve (i) determining the aggregation of the two or more respective predictions' associated confidence values by: (a) for each of the two or more of the respective predictions, determining a respective complement value of the respective prediction's associated confidence value; (b) multiplying the respective complement values together and thereby determining a product of the respective complement values; and (c) determining a complement value of the determined product of the respective complement values; and (ii) determining that the respective severity level having one or more respective predictions identified has a severity-specific confidence level that corresponds to the determined complement value. Determining the aggregation of the of the two or more respective predictions' associated confidence values may be represented mathematically as:

$$1 - \prod_{i=0}^{n} (1 - c_i), \tag{1}$$

where each prediction is labeled $i=0, \ldots, n$ and $c_i$ is the confidence of the $i^{th}$ prediction. This form of aggregation may result from a worst-case scenario assumption that the predictions are statistically independent. However, in other examples, asset data platform 210 may adopt a different approach for aggregating the confidence values of two or more respective predictions having the same severity level, such an aggregation approach assuming that at least some predictions may be statistically dependent on one another.

After determining a severity-specific risk value for the respective severity level having one or more respective predictions identified, asset data platform 210 may then use the severity-specific risk values that are determined for the respective severity levels having one or more respective predictions identified to determine the aggregated risk value for the sensor-equipped asset. Asset data platform 210 may use the severity-specific risk values that are determined for the respective severity levels having one or more respective predictions identified to determine the aggregated risk value for the sensor-equipped asset in various ways.

As one example, asset data platform 210 using the severity-specific risk values that are determined for the respective severity levels having one or more respective predictions identified to determine the aggregated risk value for the sensor-equipped asset may involve determining the aggregated risk value for the sensor-equipped asset to be whichever of the severity-specific risk values represents a highest risk. As another example, using the severity-specific risk values that are determined for the respective severity levels having one or more respective predictions identified to determine the aggregated risk value for the sensor-equipped asset may involve determining the aggregated risk value for the sensor-equipped asset to be a weighted combination of the severity-specific risk values.

To illustrate how the asset data platform 210 may determine an aggregated risk value for the sensor-equipped asset in the manner described above, consider an example where the asset data platform 210 is configured to utilize the pre-established risk dataset 400 of FIG. 4 and the given set of predictive models have rendered three predictions to be utilized for purposes of determining an aggregated risk value for the sensor-equipped asset: (1) a first prediction of whether a first type of event has occurred at the sensor-equipped asset (e.g., whether the asset has a broken tail-light), (2) a second prediction of whether a second type of event has occurred at sensor-equipped asset (e.g., whether the asset has experienced battery degradation), and (3) a third prediction of whether a third type of event has occurred at the sensor-equipped asset (e.g., whether the asset has experienced engine overheating). Further, in this example, the first prediction may have a confidence value of 70% and a severity value of "Negligible," the second prediction may have a confidence value of 20% and a severity value of "Critical," and the third prediction may have a confidence value of 35% and a severity value of "Critical."

Continuing this example, asset data platform 210 may begin by grouping the three respective predictions based on the four severity levels 408 defined within risk dataset 400 and then identifying the severity levels for which there are corresponding predictions. In this respect, asset data platform 210 may identify the severity level of "Negligible," has one corresponding prediction (the first prediction), and the severity level of "Critical," which has two corresponding predictions (the second and third predictions). For the severity levels of "Negligible" and "Critical," asset data platform 210 may then determine a severity-specific risk level as described above. Moreover, as the severity levels of "Marginal" and "Catastrophic" do not have any corresponding predictions, the asset data platform 210 may not evaluate these severity levels further.

Turning first to the severity level of "Negligible," because it has only one corresponding prediction, asset data platform 210 may determine that it has a severity-specific confidence level that matches the one corresponding prediction's confidence value, which is the first prediction's confidence value of 70%. In turn, based on the "Negligible" severity level's severity-specific confidence level of 70% and the pre-established risk dataset, asset data platform 210 may determine that the "Negligible" severity level has a severity-specific risk value of "Very Low."

Turning next to the severity level of "Critical," because it has two corresponding predictions, asset data platform 210 may determine that it has a severity-specific confidence level that comprises an aggregation of the two respective predictions' confidence values. In particular, using equation (1), the severity-specific confidence level for the severity level of "Critical" may be determined as follows: $1-(1-0.2)*(1-0.35)=0.48$ (i.e., 48%). In turn, based on the "Critical" severity level's severity-specific confidence level of 48% and the pre-established risk dataset, asset data platform 210 may determine that the "Critical" severity level has a severity-specific risk value of "High."

After determining that the severity-specific risk value for the severity level of "Negligible" is "Very Low" and the severity-specific risk value for the severity level of "Critical" is "High." asset data platform 210 may use these severity-specific risk values as a basis for determining the aggregated risk value for the sensor-equipped asset. For example, asset data platform 210 may determine that the highest severity-specific risk value across the different severity levels is the severity-specific risk value of "High"

that was determined for the "Critical" severity level, and may in turn determine that the aggregated risk value comprises this "High" risk value.

Figure 6:
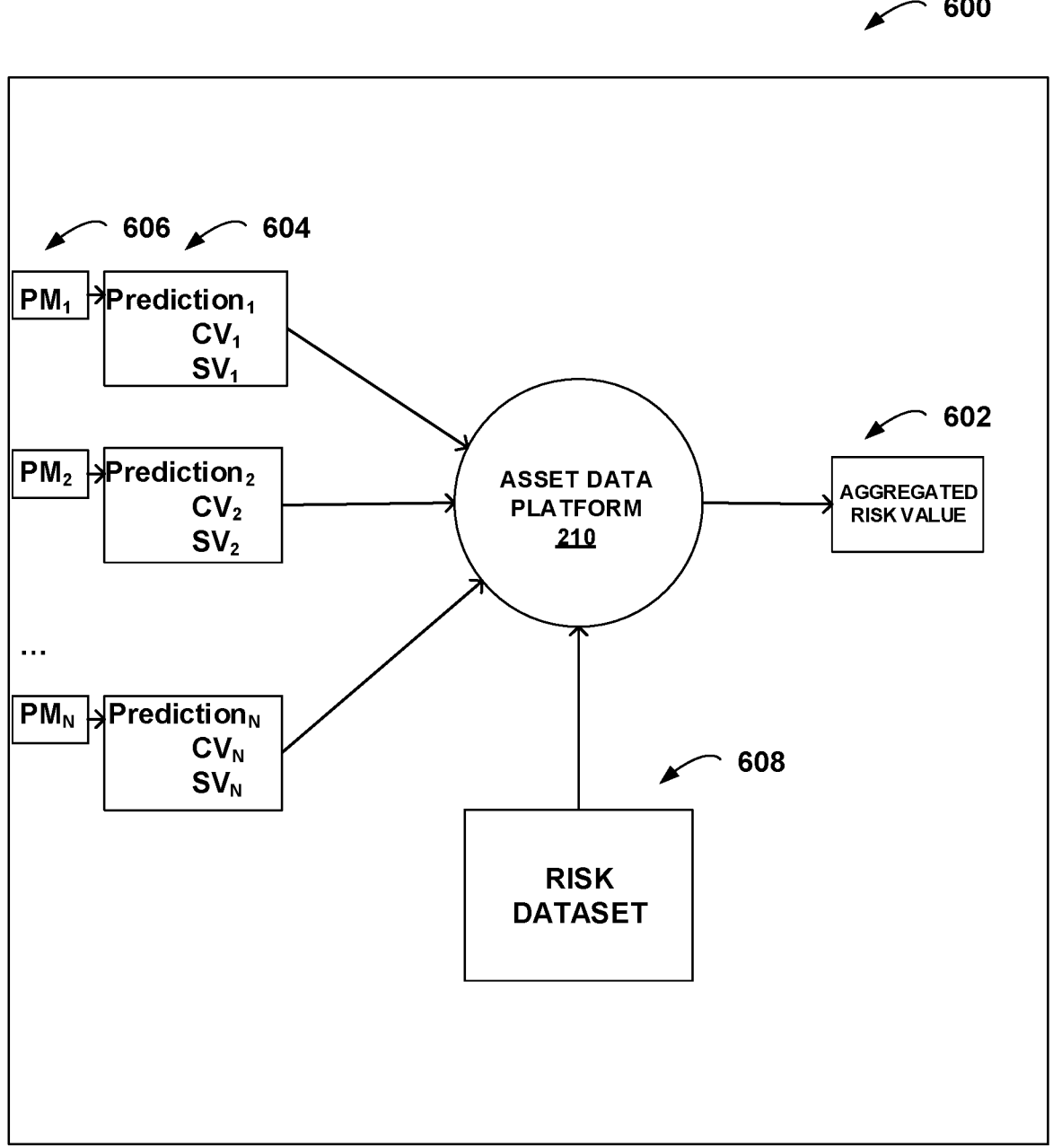
FIG. 6 is a conceptual illustration of an example operation for determining an aggregated risk value of the sensor-equipped asset based on a set of predictions and a risk dataset, in accordance with various embodiments disclosed herein.

FIG. 6 is a conceptual illustration of an example operation 600 for determining an aggregated risk value 602 of the sensor-equipped asset based on a set of predictions and a risk dataset, in accordance with various embodiments disclosed herein. In particular, asset-data platform 210 may determine aggregated risk value 602 based on (i) a set of predictions 604 (which are each output by a corresponding predictive model from set of predictive models 606) and (i) a risk dataset 608.

As illustrated in FIG. 6, the asset data platform 210 may receive each of the set of predictions 604 and the risk dataset 608 in order to determine the aggregated risk value 602, but it should be appreciated that this is for the purposes of illustration only. Namely, the asset data platform 210 may include the set of predictive models 606, the set of predictions 604, and the risk dataset 608 in memory (e.g., data storage subsystem 222) prior to determining the aggregated risk value 602. Thereafter, the asset data platform 210 may also store the aggregated risk value 602 in memory.

In any event, returning to FIG. 5, at block 510, asset data platform 210 causes a client device to display a visual representation of the aggregated risk value that is determined for the sensor-equipped asset. The visual representation of the aggregated risk value that is determined for the sensor-equipped asset may be displayed at the client station in various forms.

Figure 7A:
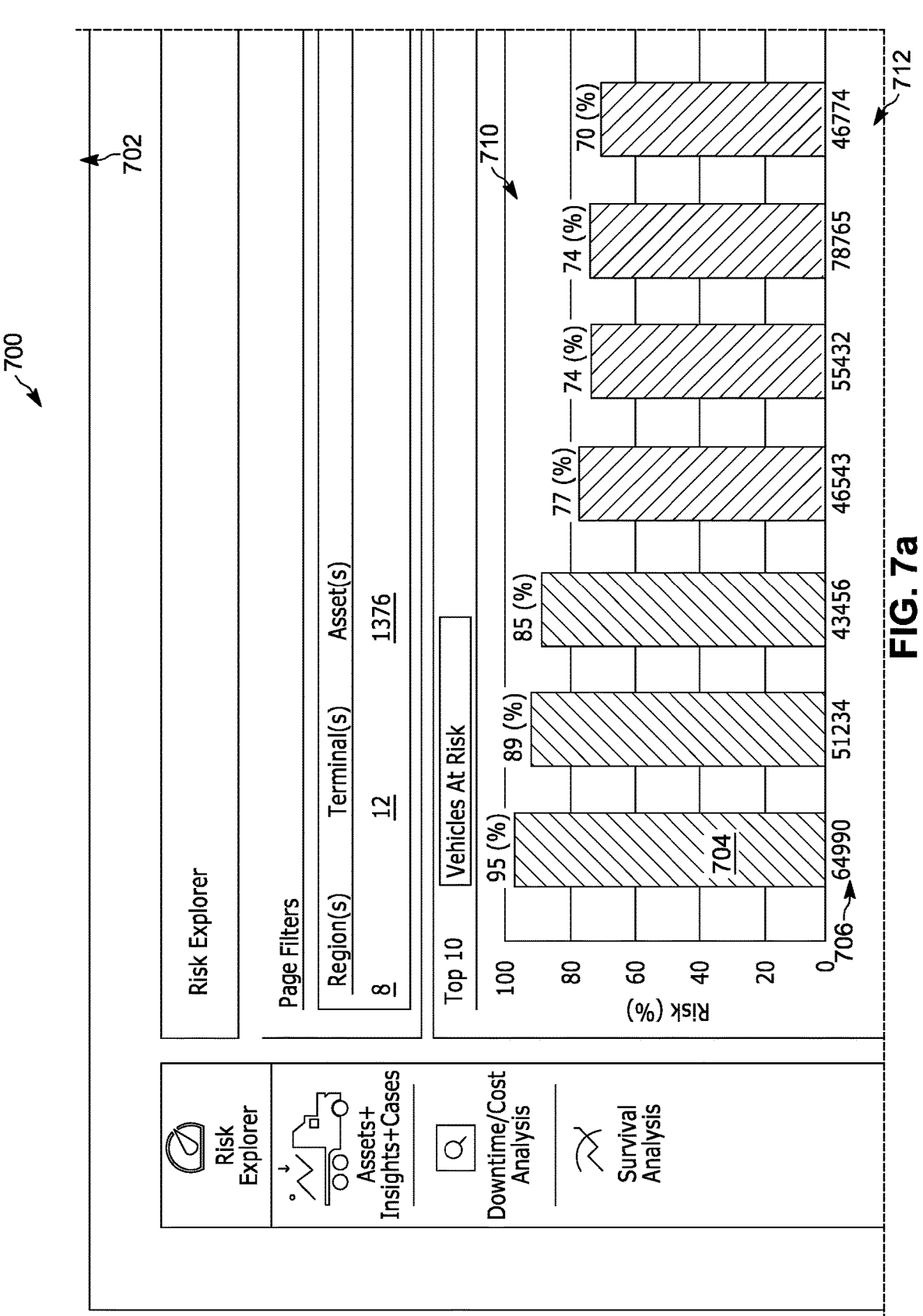
FIG. 7A depicts an example graphical user interface (GUI) that may be presented to a user, in accordance with various embodiments disclosed herein.
Figure 7A:
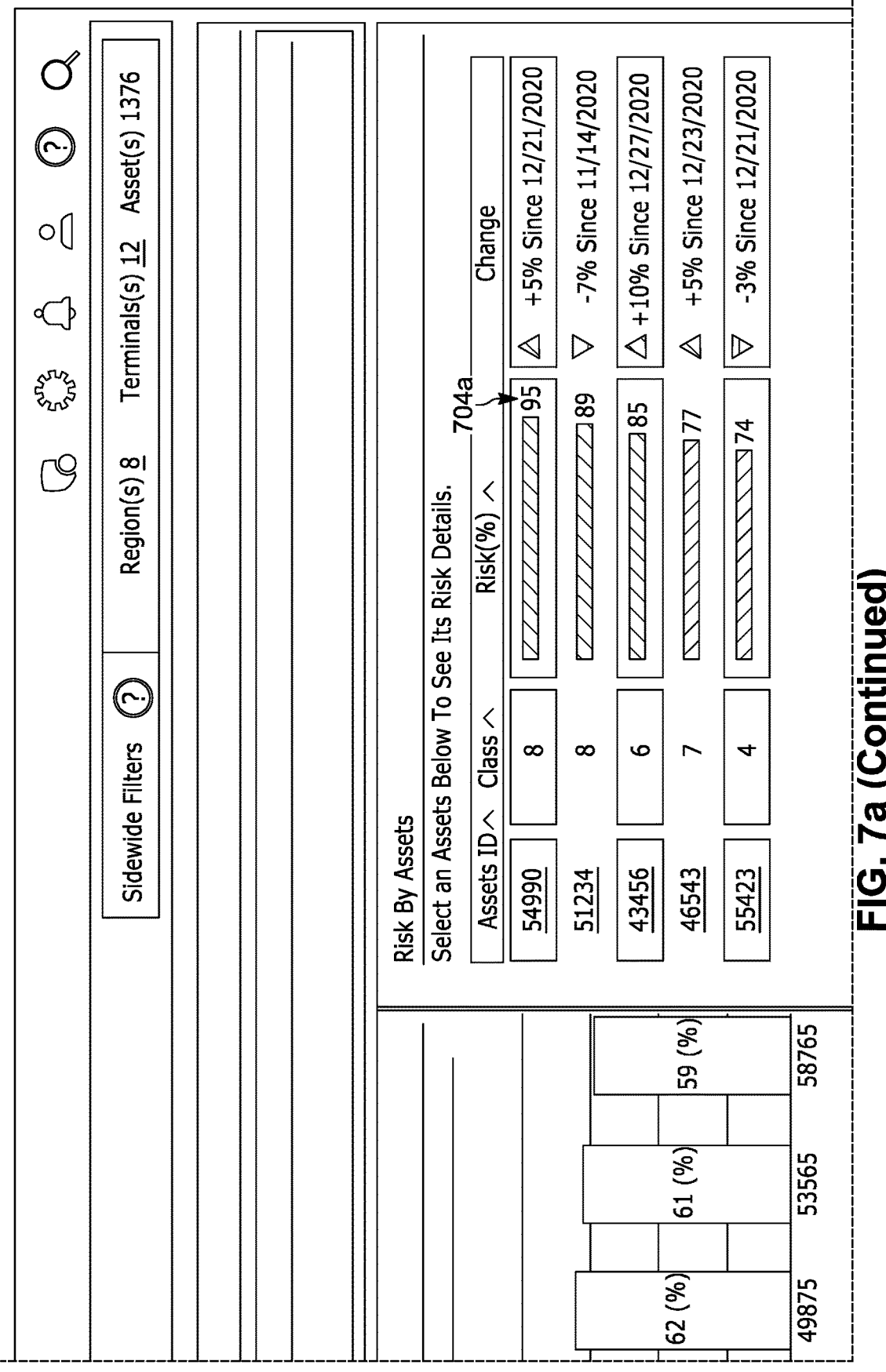
Figure 7A:
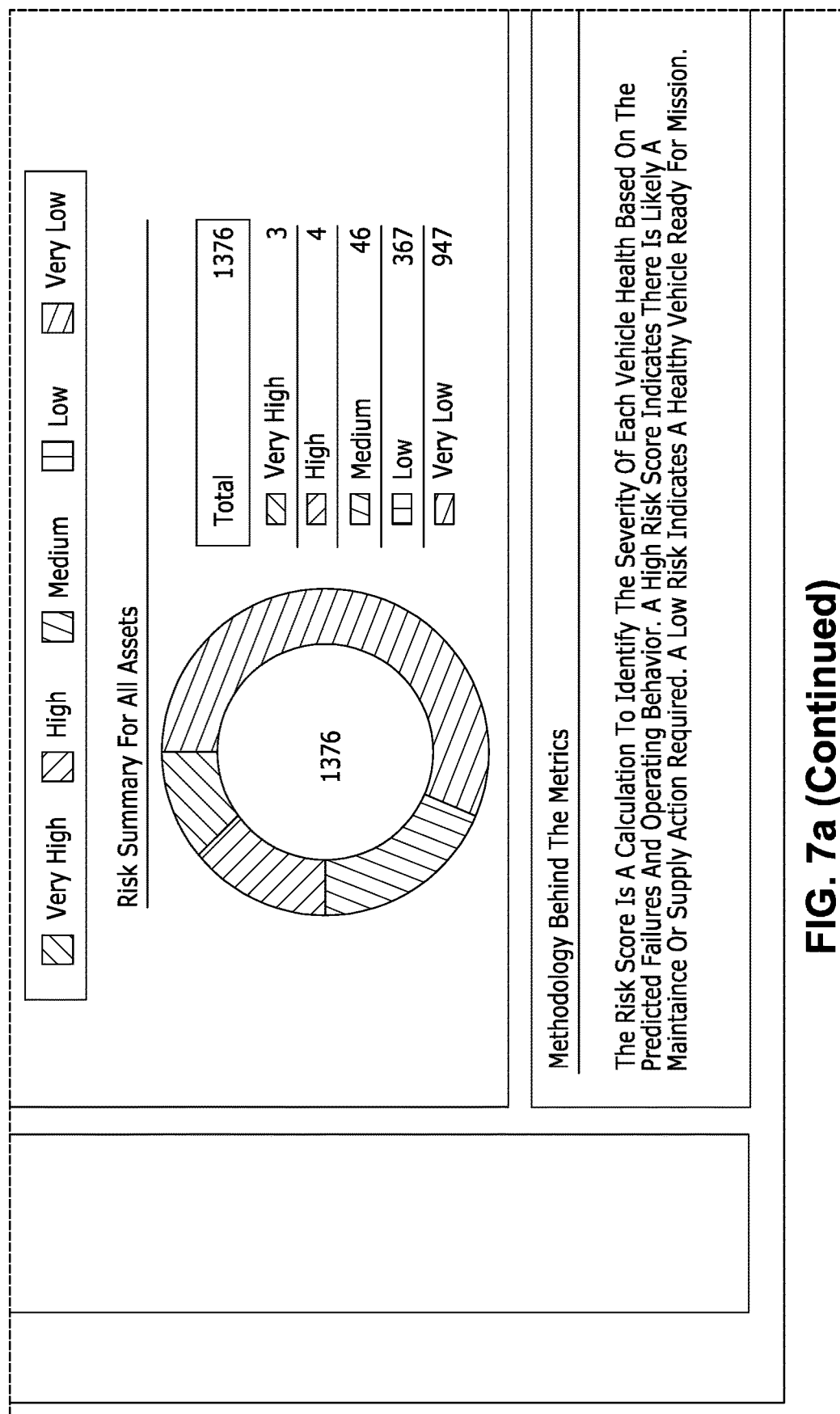
Figure 7A:
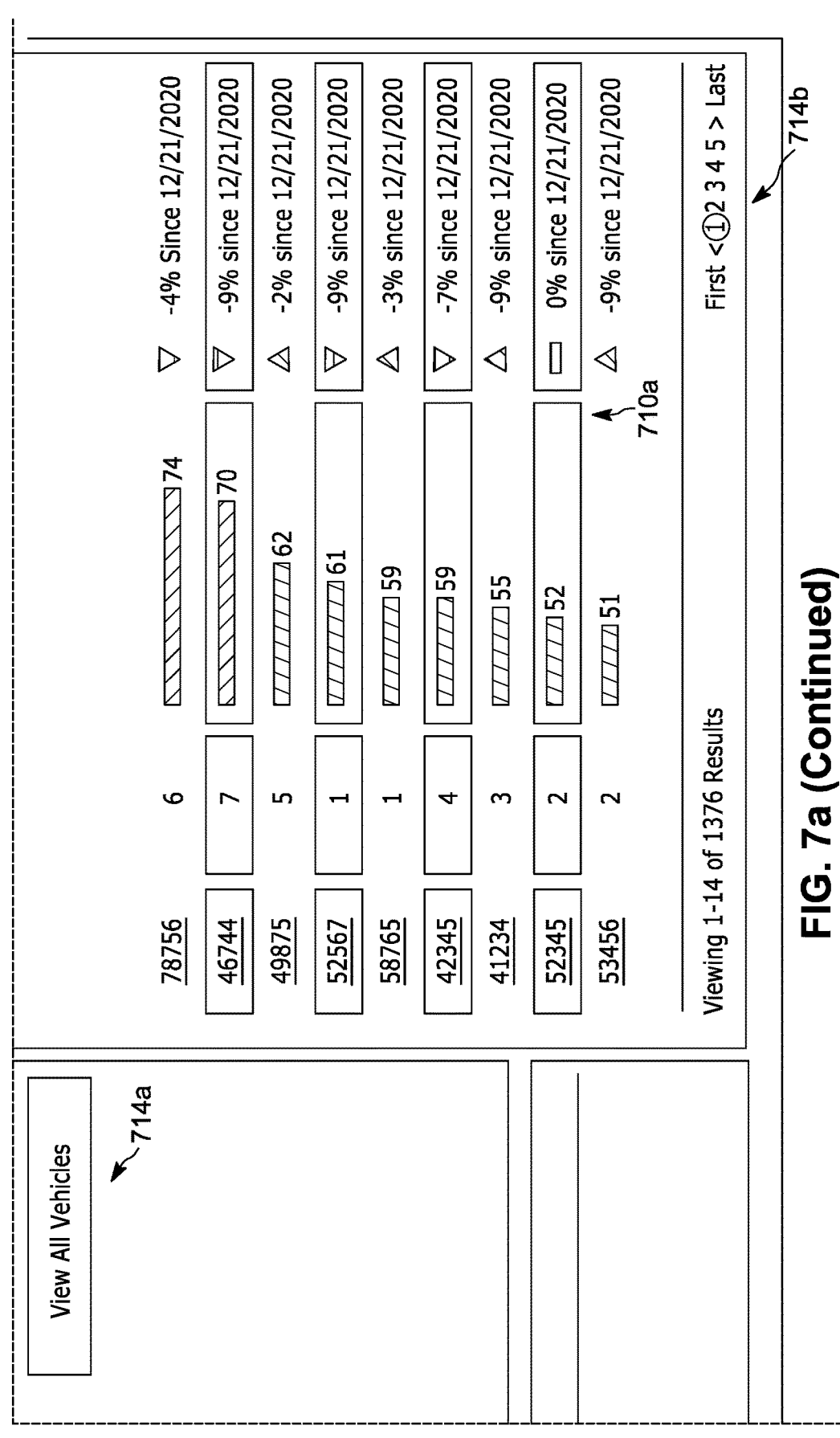

FIG. 7A depicts an example snapshot 700 of a GUI 702 that displays visual representations of asset-level aggregated risk values for various different sensor-equipped assets, including a visual representation 704 of an asset-level aggregated risk value for a sensor-equipped asset 706 having an "Asset ID" of "64990." As shown, visual representation 704 of an asset-level aggregated risk value for the sensor-equipped asset 706 indicates that the sensor-equipped asset 706 has an asset-level aggregated risk value of 95%, which is categorized as "Very High." Here, the visual representation 704 takes the form of a vertical color-coded bar that serves to indicate the aggregated risk value, but the visual representation may take other forms as well.

In some examples, GUI 702 may include a plurality of visual representations of a given aggregated risk value for a given asset. For instance, GUI 702 is shown to also include a second visual representation 704a of the asset-level aggregated risk value for a sensor-equipped asset 706, which takes the form of a horizontal bar that serves to indicate the aggregated risk value.

As noted above, in addition to causing a client device to display a visual representation of the aggregated risk value for a sensor-equipped asset, asset data platform 210 may be configured to display visual representations of aggregated risk values for a plurality of other sensor-equipped assets (e.g., a plurality of assets being managed by an entity associated with the client station). For example, GUI 702 also includes visual representations 710 of asset-level aggregated risk values for a plurality of other sensor-equipped assets 712 as well. Similar to including second visual representation 704a for sensor-equipped asset 706, GUI 702 may also include second visual representations 710a of the aggregated risk value a plurality of other sensor-equipped assets as well.

While the second visual representations may present the same information (i.e., asset-level aggregated risk values) for visual representations 706 and 710 that take the form of vertical bar charts, the second visual representations provide a more compact view of the asset-level aggregated risk values that allows asset data platform 210 to display more aggregated risk values on a single screen when compared to the first visual representations. Further, in some examples, a user may view visual representations of aggregated risk values for one or more additional sensor-equipped assets by interacting with GUI elements 714a and/or 714b to view information for additional assets. In the example of FIG. 7a, the GUI 702 indicates that there are 1376 assets, and asset data platform 210 may be configured to determine (and thereafter display) aggregated risk values for each of those assets.

As mentioned above, in an example, asset data platform 210 performs method 500 for each of a plurality of subsystems. Therefore, asset-data platform 210 may determine aggregated risk values that take the form of subsystem-level values for a plurality of subsystems. After subsystem-level values for a plurality of subsystems, asset-data platform 210 may then cause the client device display visual indications for the subsystem-level risk values.

Figure 7B:
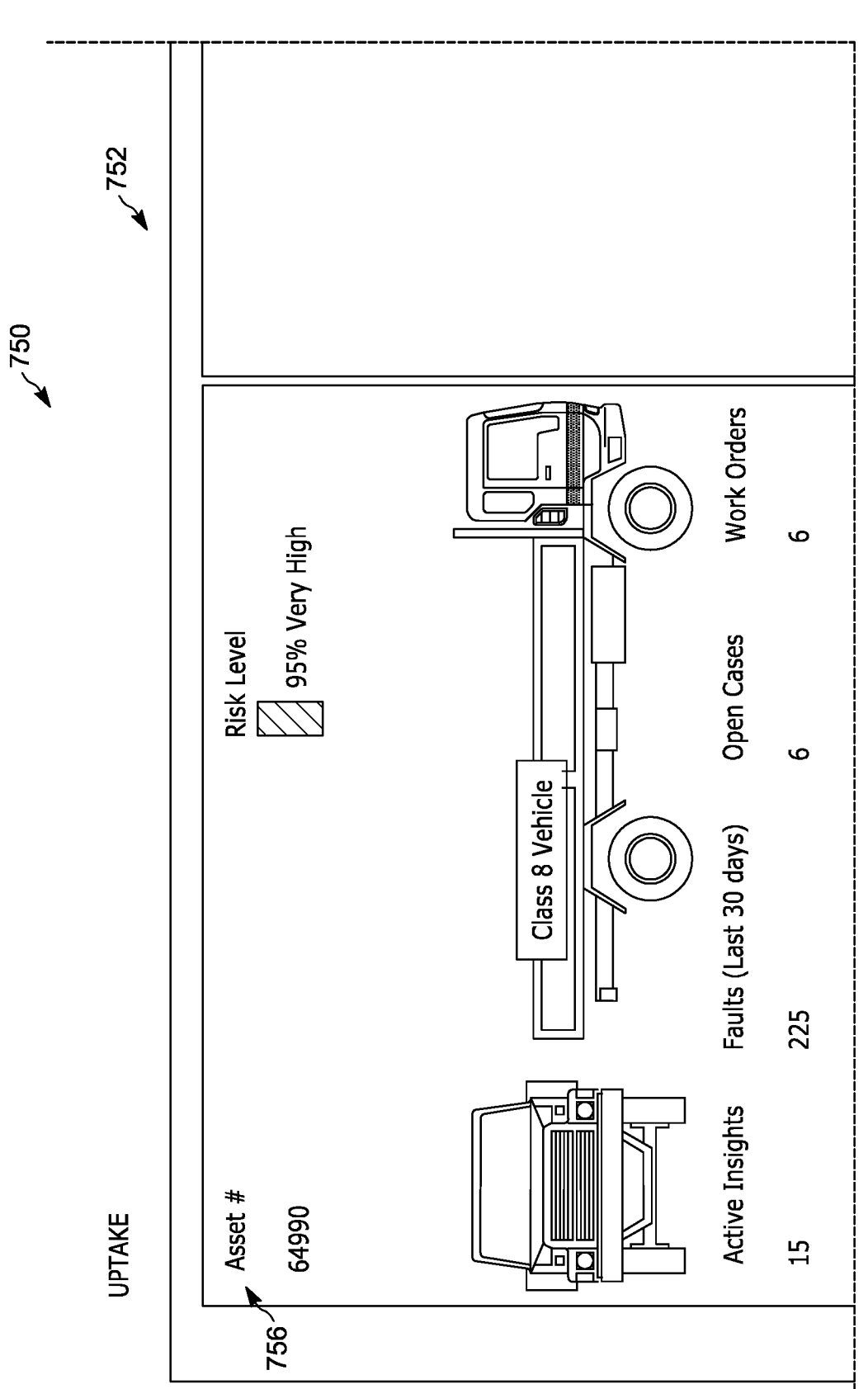
FIG. 7B depicts another GUI that may be presented to a user, in accordance with various embodiments disclosed herein.
Figure 7B:
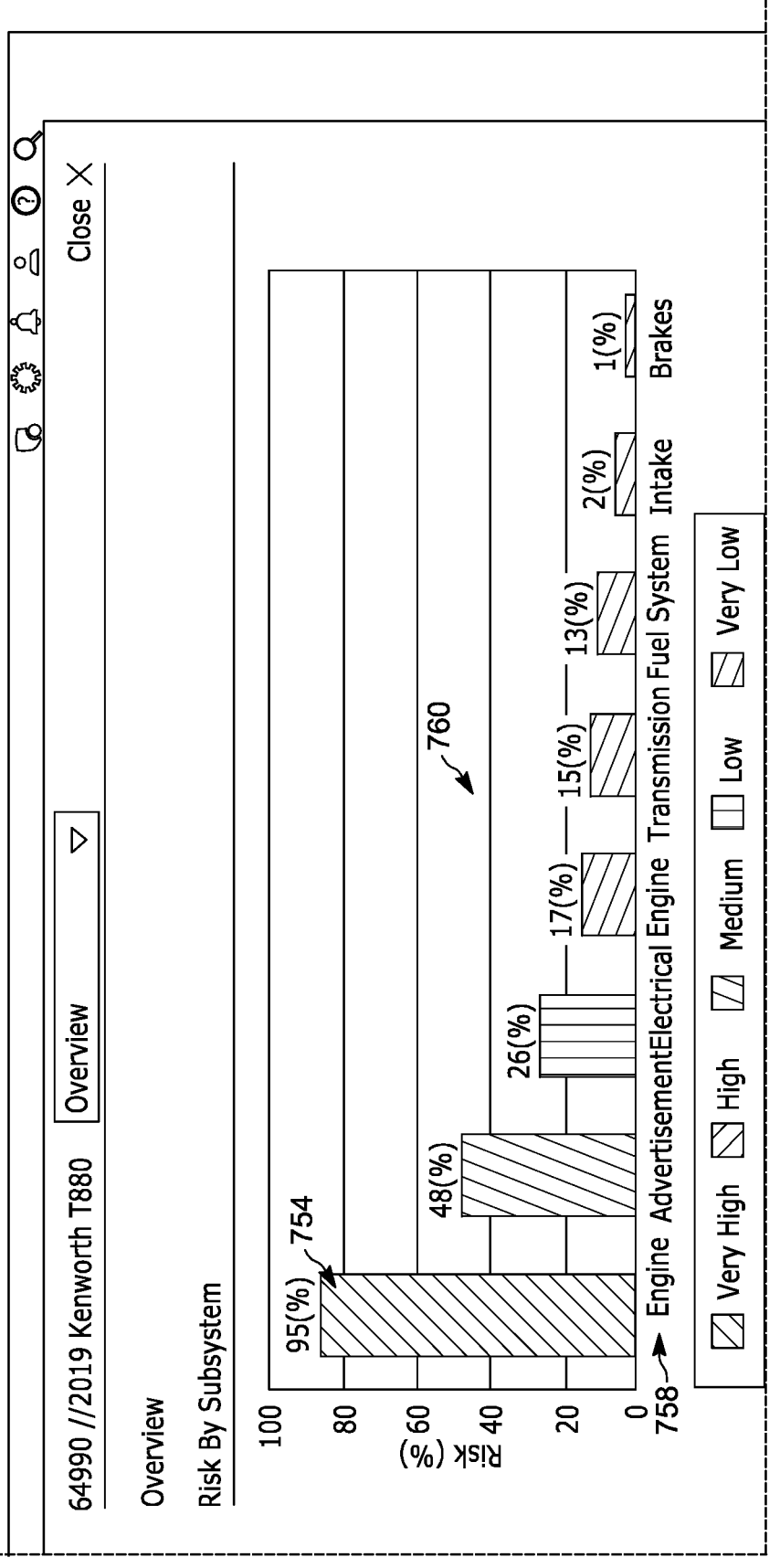

FIG. 7B depicts another example snapshot 750 of a GUI 752 that displays a visual representation 754 of the aggregated risk value for a sensor-equipped asset 756. In the example of FIG. 7B, the aggregated risk value of visual representation 754 is a subsystem-level aggregated risk value. In particular, in this example of FIG. 7B, sensor-equipped asset 756 is identified with an "Asset ID" of "64990" and the subsystem 758 (identified as "Engine") of sensor-equipped asset 756 (identified with an "Asset ID" of "64990") has an aggregated risk value of "Very High."

In addition to causing a client device to display a visual representation of a given subsystem-level aggregated risk value for a sensor-equipped asset, asset data platform 210 may be configured to display a plurality of visual representations of subsystem-level aggregated risk values for the sensor-equipped asset (e.g., a plurality of subsystems of the sensor-equipped asset 756. For instance, GUI 752 also includes visual representations 760 of other subsystem-level aggregated risk values for sensor-equipped asset 756. In the example of FIG. 7B, GUI 752 displays visual representations of subsystem-level aggregated risk values for the subsystems of "Aftertreatment," "Cooling," "Electrical," "Transmission," "Fuel System," and "Brakes." Further, in addition to displaying visual representations of subsystem-level aggregated risk values, GUI 752 may also display risk values for individual predictions associated with given subsystems. For instance, GUI 752 displays risk values 762 for predictions related to "Engine Overheating" and "DPF Regen Issue" for the subsystem of "Engine," risk values for predictions related to "EGR Cooler" and "Coolant Leak" for the subsystem of "Aftertreatment," and a risk value for a prediction related to "Engine Protection" for the subsystem of "Cooling."

In some examples, asset data platform 210 may be configured to use an aggregated risk value to trigger one or more actions for the sensor-equipped asset. In some cases, asset data platform 210 may determine that aggregated risk value for the sensor-equipped asset meets a threshold risk criteria and, in response to the determination, carry out a remedial action for the sensor-equipped asset. Such actions may be referred to herein as "preventative actions" in that these actions aim to help prevent a failure from occurring.

Various actions are possible in the event that aggregated risk value for the sensor-equipped asset meets a threshold risk criteria. For example, asset data platform 210 may be configured to cause output system 106 to display a warning or alert. For instance, the warning or alert may include a visual, audible, or combination thereof indication of the aggregated risk value. In a particular case, asset data platform 210 may cause output system 106 to display animated visualizations, such as flashing or growing visualizations, and/or output an alarm sound or the like.

In another example, based on the aggregated risk value for the sensor-equipped asset meeting a threshold risk criteria, asset data platform 210 may generate a list of one or more recommended actions that may help increase the health of the given asset. For instance, a recommended action may be to repair a particular subsystem of asset 230, to operate asset 230 according to certain operating conditions, or to steer asset 230 around a particular geographical region, among other examples. Asset data platform 210 may then cause output system 106 to output an indication of the recommended actions.

In other examples, based on the aggregated risk value for the sensor-equipped asset meeting a threshold risk criteria, asset data platform 210 may be configured to cause a work-order system to generate a work order to repair asset 230. In particular, asset data platform 210 may transmit work-order data to a work-order system that causes the work-order system to output a work order, which may specify a certain repair that may help increase the health of the asset. Similarly, asset data platform 210 may be configured to transmit part-order data to cause a parts-ordering system to order a particular part for the asset 230 that may be needed in the repair of asset 230.

In yet other examples, based on the aggregated risk value for the sensor-equipped asset meeting a threshold risk criteria, asset data platform 210 may be configured to transmit to asset 230 one or more commands that facilitate modifying one or more operating conditions of asset 230. For instance, a command may cause asset 230 to decrease (or increase) velocity, acceleration, fan speed, propeller angle, and/or air intake, among other examples.

Further, various threshold risk criteria are possible, and the threshold risk criteria may vary depending on the sensor-equipped asset and/or the given level to which the aggregated risk values applies (e.g., system level or subsystem level), the remedial action being applied, and/or company preferences, among other possibilities. In an example, a threshold risk criteria may be a given risk-value level. For instance, for one given asset, the threshold risk criteria used to trigger a remedial action may be a risk-value level of "Medium" or higher. Further, for another given asset, the threshold risk criteria used to trigger a remedial action may be a risk-value level of "High" or higher. Other examples are possible as well.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a value disclosed as "50 percent" is intended to mean "about 50 percent."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computing platform for determining aggregated risk values, comprising:
   a communication interface;
   one or more processors;
   a non-transitory computer-readable medium; and
   program instructions stored on the non-transitory computer-readable medium that are executable by the one or more processors to cause the computing platform to:
      based on operating data for a sensor-equipped asset, execute a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value,
      wherein the operating data comprises at least one of: (a) measure data of the sensor-equipped asset, or (b) data indicating an abnormal condition occurrence of the sensor-equipped asset;
      detect a triggering event for determining an aggregated risk value for the sensor-equipped asset;
      responsive to detecting the triggering event, identify (i) a set of predictions related to the operation of the sensor-equipped asset based on the operating data and (ii) a risk dataset, wherein the risk dataset defines (a) a first set of confidence levels, (b) a second set of severity levels, and (c) a risk value for each pairing of a confidence level from the first set and a severity level from the second set;

determine the aggregated risk value of the sensor-equipped asset based on the set of predictions and the risk dataset by:

for each severity level from the second set, identifying a matching associated severity value from the respective predictions;

for each severity level having one or more matching associated severity values from the respective predictions identified:

determining a severity-specific confidence level by either:

(i) if one matching associated severity value is identified, determining that the respective severity level has a severity-specific confidence level corresponding to an associated confidence value of the respective prediction, or (ii) if two or more of the respective predictions are identified, determining that the respective severity level has a severity-specific confidence level corresponding to an aggregation of associated confidence values of the respective predictions, wherein the aggregation is determined by: for each of the two or more of the respective predictions, determining a complement value of the associated confidence values, multiplying the complement values together and thereby determining a product of the complement values, and determining a product complement value of the product of the complement values, and determining that the severity-specific confidence level corresponds to the product complement value, and based on the severity-specific confidence level and the risk dataset, determining a severity-specific risk value for the respective severity level;

comparing the one or more severity-specific risk values to determine a highest risk value; and determining that the highest risk value is the aggregated risk value for the sensor-equipped asset; and cause a client device to display a visual representation of the aggregated risk value for the sensor-equipped asset;

determine that the aggregated risk value for the sensor-equipped asset meets a threshold risk criteria; and in response to the determination, execute a remedial action for the sensor-equipped asset, wherein the remedial action comprises causing the sensor-equipped asset to modify its physical operation.

2. The computing platform of claim 1, wherein the aggregated risk value comprises an asset-level aggregated risk value, and wherein the set of predictive models comprises predictive models related to a plurality of subsystems of the sensor-equipped asset.

3. The computing platform of claim 1, wherein the aggregated risk value comprises a subsystem-level aggregated risk value, and wherein the set of predictive models comprises predictive models related to a subsystem of the sensor-equipped asset.

4. The computing platform of claim 1, wherein the risk dataset comprises a risk dataset that is pre-established based on user input.

5. The computing platform of claim 1, wherein the remedial action comprises one or more of: (a) causing a computing device to output an alert indicating that the aggregated risk value for the sensor-equipped asset meets the threshold risk criteria, (b) causing the computing device to output an indication of one or more recommended repairs to the sensor-equipped asset, or (c) transmitting, to a parts ordering system, part-order data to cause the parts-ordering system to order a component for the sensor-equipped asset.

6. The computing platform of claim 1, wherein the set of predictive models comprises one or more of: (i) an event-prediction model, (ii) a survival analysis model, (iii) an anomaly detection model, or (iv) a rule-based model.

7. The computing platform of claim 1, wherein the program instructions are further executable by the at least one processor to cause the computing platform to:

prior to receiving the operating data for the sensor-equipped asset, cause a second client device to present an interface for establishing the risk dataset.

8. The computing platform of claim 7, wherein:

the respective confidence value represents a likelihood of the respective prediction being correct; and the respective severity value is from a set of predefined severity values available for assignment to predictions, wherein each severity value in the set of predefined severity values is a predefined categorization of impact severity that provides an indication of how severely the operation of the sensor-equipped asset is expected to be impacted by an occurrence of an event related to the operation of the sensor-equipped asset.

9. The computing platform of claim 1, wherein:

each confidence level of the first set comprises a range of confidence values;

each severity level of the second set is from a set of predefined severity levels available for assignment to predictions; and the risk value is from a set of risk values and comprises a textual indicator that indicates a risk associated with a prediction.

10. A computer-implemented method for determining aggregated risk values comprising:

executing, by one or more processors and based on operating data for a sensor-equipped asset, a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value, wherein the operating data comprises at least one of: (a) measure data of the sensor-equipped asset, or (b) data indicating an abnormal condition occurrence of the sensor-equipped asset;

detecting, by the one or more processors, a triggering event for determining an aggregated risk value for the sensor-equipped asset;

responsive to detecting the triggering event, identifying, by the one or more processors, (i) a set of predictions related to the operation of the sensor-equipped asset based on the operating data and (ii) a risk dataset, wherein the risk dataset defines (a) a first set of confidence levels, (b) a second set of severity levels, and (c) a risk value for each pairing of a confidence level from the first set and a severity level from the second set;

determining, by the one or more processors, the aggregated risk value of the sensor-equipped asset based on the set of predictions and the risk dataset by:

for each severity level from the second set, identifying, by the one or more processors, a matching associated severity value from the respective predictions;

for each severity level having one or more matching associated severity values from the respective predictions identified:

determining, by the one or more processors, a severity-specific confidence level by either:

(i) if one matching associated severity value is identified, determining that the respective severity level has a severity-specific confidence level corresponding to an associated confidence value of the respective prediction, or (ii) if two or more of the respective predictions are identified, determining that the respective severity level has a severity-specific confidence level corresponding to an aggregation of associated confidence values of the respective predictions, wherein the aggregation is determined by: for each of the two or more of the respective predictions, determining a complement value of the associated confidence values, multiplying the complement values together and thereby determining a product of the complement values, and determining a product complement value of the product of the complement values, and determining that the severity-specific confidence level corresponds to the product complement value, and based on the severity-specific confidence level and the risk dataset, determining, by the one or more processors, a severity-specific risk value for the respective severity level;

comparing, by the one or more processors, the one or more severity-specific risk values to determine a highest risk value; and determining, by the one or more processors, that the highest risk value is the aggregated risk value for the sensor-equipped asset; and causing, by the one or more processors, a client device to display a visual representation of the aggregated risk value for the sensor-equipped asset;

determining, by the one or more processors, that the aggregated risk value for the sensor-equipped asset meets a threshold risk criteria; and in response to the determination, executing, by the one or more processors, a remedial action for the sensor-equipped asset, wherein the remedial action comprises causing the sensor-equipped asset to modify its physical operation.

11. The computer-implemented method of claim 10, wherein the remedial action comprises one or more of: (a) causing a computing device to output an alert indicating that the aggregated risk value for the sensor-equipped asset meets the threshold risk criteria, (b) causing the computing device to output an indication of one or more recommended repairs to the sensor-equipped asset, or (c) transmitting, to a parts ordering system, part-order data to cause the parts-ordering system to order a component for the sensor-equipped asset.

12. A non-transitory computer readable storage medium comprising computer readable instructions stored thereon for determining aggregated risk values, the instructions when executed on one or more processors cause the one or more processors to:

execute, based on operating data for a sensor-equipped asset, a set of predictive models, wherein each predictive model in the set of predictive models is configured to (i) evaluate a respective portion of the operating data for the sensor-equipped asset and (ii) output a respective prediction related to an operation of the sensor-equipped asset, each respective prediction having a respective confidence value and a respective severity value, wherein the operating data comprises at least one of: (a) measure data of the sensor-equipped asset, or (b) data indicating an abnormal condition occurrence of the sensor-equipped asset;

detect a triggering event for determining an aggregated risk value for the sensor-equipped asset;

responsive to detecting the triggering event, identify (i) a set of predictions related to the operation of the sensor-equipped asset based on the operating data and (ii) a risk dataset, wherein the risk dataset defines (a) a first set of confidence levels, (b) a second set of severity levels, and (c) a risk value for each pairing of a confidence level from the first set and a severity level from the second set;

determine the aggregated risk value of the sensor-equipped asset based on the set of predictions and the risk dataset by:

for each severity level from the second set, identifying a matching associated severity value from the respective predictions;

for each severity level having one or more matching associated severity values from the respective predictions identified:

determining a severity-specific confidence level by either:

(i) if one matching associated severity value is identified, determining that the respective severity level has a severity-specific confidence level corresponding to an associated confidence value of the respective prediction, or (ii) if two or more of the respective predictions are identified, determining that the respective severity level has a severity-specific confidence level corresponding to an aggregation of associated confidence values of the respective predictions, wherein the aggregation is determined by: for each of the two or more of the respective predictions, determining a complement value of the associated confidence values, multiplying the complement values together and thereby determining a product of the complement values, and determining a product complement value of the product of the complement values, and determining that the severity-specific confidence level corresponds to the product complement value, and based on the severity-specific confidence level and the risk dataset, determining a severity-specific risk value for the respective severity level;

comparing the one or more severity-specific risk values to determine a highest risk value; and determining that the highest risk value is the aggregated risk value for the sensor-equipped asset; and cause a client device to display a visual representation of the aggregated risk value for the sensor-equipped asset;

determine that the aggregated risk value for the sensor-equipped asset meets a threshold risk criteria; and in response to the determination, execute a remedial action for the sensor-equipped asset, wherein the remedial action comprises causing the sensor-equipped asset to modify its physical operation.

* * * * *